(12) United States Patent
Cartigny et al.

(10) Patent No.: US 10,136,357 B2
(45) Date of Patent: Nov. 20, 2018

(54) METHOD FOR MANAGING CONGESTION OF A TRANSMISSION LINK IN A PACKET COMMUNICATION NETWORK

(71) Applicant: AIRBUS DEFENCE AND SPACE SAS, Les Mureaux (FR)

(72) Inventors: Marc Cartigny, Chatou (FR); Claude Poletti, Fontenay aux Roses (FR); Olivier Klotz, Champigny sur Marne (FR)

(73) Assignee: Airbus Defence and Space SAS, Toulouse (FR)

( * ) Notice: Subject to any disclaimer, the term of this patent is extended or adjusted under 35 U.S.C. 154(b) by 93 days.

(21) Appl. No.: 15/265,567

(22) Filed: Sep. 14, 2016

(65) Prior Publication Data

US 2017/0070910 A1   Mar. 9, 2017

Related U.S. Application Data

(63) Continuation of application No. PCT/EP2015/055348, filed on Mar. 13, 2015.

(30) Foreign Application Priority Data

Mar. 14, 2014 (FR) ..................................... 14 00619

(51) Int. Cl.
*H04W 28/02* (2009.01)
*H04L 12/801* (2013.01)
(Continued)

(52) U.S. Cl.
CPC ..... *H04W 28/0289* (2013.01); *H04L 43/0876* (2013.01); *H04L 47/11* (2013.01); *H04L 47/24* (2013.01)

(58) Field of Classification Search
CPC .................................................. H04W 28/0289
See application file for complete search history.

(56) References Cited

U.S. PATENT DOCUMENTS

| 7,336,611 B1 * | 2/2008 | Aweya | ..................... H04L 47/10 370/235 |
| 2007/0053286 A1 * | 3/2007 | Jain | ....................... H04L 49/501 370/229 |

(Continued)

FOREIGN PATENT DOCUMENTS

WO   WO 2012/055783   5/2012

OTHER PUBLICATIONS

International Search Report for Application No. PCT/EP2015/055348 dated Jun. 10, 2015.

(Continued)

*Primary Examiner* — Andrew Lai
*Assistant Examiner* — Andrew C Lee
(74) *Attorney, Agent, or Firm* — Jenkins, Wilson, Taylor & Hunt, P.A.

(57) ABSTRACT

In order to detect congestion on a transmission link, endpoint items of network equipment are associated with congestion-detection applications. Per class of service, one application sends to the other control messages indicating volumes of data transmitted by the concerned item of network equipment via the transmission link. On reception of the control messages, the other application obtains information on volumes of data received by the other item of network equipment. By determining a first divergence in volumes of data transmitted between two control messages and a second divergence in volumes of data received, between two control messages, this other application is able (Continued)

to detect a situation of congestion on the transmission link occurring for one or more classes of service, and to generate an alarm signal accordingly.

15 Claims, 10 Drawing Sheets

(51) Int. Cl.
*H04L 12/26* (2006.01)
*H04L 12/851* (2013.01)

(56) References Cited

U.S. PATENT DOCUMENTS

| | | | |
|---|---|---|---|
| 2008/0002677 A1* | 1/2008 | Bugenhagen | H04L 12/14 370/356 |
| 2008/0052394 A1* | 2/2008 | Bugenhagen | H04L 12/14 709/224 |
| 2008/0317039 A1* | 12/2008 | Satterlee | H04L 12/66 370/395.5 |
| 2009/0129260 A1* | 5/2009 | Qian | H04L 41/0631 370/216 |
| 2009/0196182 A1 | 8/2009 | Barnett et al. | |

OTHER PUBLICATIONS

Request for Comments 2474: K. Nichols et al., "Definition of the Differentiated Services Fields (DS Field) in the IPv4 and IPv6 Headers," dated Dec. 1998; Accessed Sep. 15, 2016.
Request for Comments 2475: S. Blake et al., "An Architecture for Differentiated Services," dated Dec. 1998; Accessed Sep. 15, 2016.
Request for Comments 791: Information Sciences Institute, University of Southern California, "Internet Protocol: DARPA Internet Program, Protocol Specification," dated Sep. 1981; Accessed Sep. 15, 2016.
Request for Comments 2460: S. Deering, et al., "Internet Protocol, Version 6 (IPv6) Specification," dated Dec. 1998; Accessed Sep. 15, 2016.
English Translation of the International Search Report with Written Opinion for Application No. PCT/EP2015/055348 dated Jun. 10, 2015.

* cited by examiner ized. It is then the that the packets are colored, meaning that they are respectively marked by classes of service CoS and the network equipment that has to process the packets shall apply to the packets a QoS plan dependent on the classes of service CoS.

METHOD FOR MANAGING CONGESTION OF A TRANSMISSION LINK IN A PACKET COMMUNICATION NETWORK

CROSS-REFERENCE TO RELATED APPLICATION

This application is a continuation of and claims priority to PCT Application Serial No. PCT/EP2015/055348 filed Mar. 13, 2015, which claims the benefit of the filing date of French Application Serial No. 14 006119 filed Mar. 14, 2014, the entire disclosures of both of which are incorporated by reference herein.

TECHNICAL FIELD

The present disclosure relates to the management of congestion situations, for one or more service classes, on a transmission link in a packet communication network.

BACKGROUND

Packet communication networks consist of a plurality of communication nodes connected together by communication links. These communication nodes may be terminal equipment, such as computer stations, mobile communication terminals or application servers. These communication nodes may also be intermediate equipment, such as switches or routers, which serve to provide interconnection of the terminal equipment and serve to provide routing of data between the terminal equipment.

The communication links are based on highly diverse physical transmission technologies, whether they be wired (optical fibre, Ethernet, etc.) or wireless (WiFi, WiMax, satellite connection, etc.). These transmission technologies intrinsically lead to different transmission channel properties, in particular in terms of variability of available bandwidth.

These packet communication networks serve to implement a great diversity of services, such as for example services of the VoIP (Voice over IP) type, audiovisual transmission services or Web services. These services have requirements in terms of bandwidth and/or latency that depend on the service in question. To allow the development of services having constraint requirements in terms of bandwidth and/or latency of packet communication networks, QoS (Quality of Service) management technologies are implemented. These technologies are based on the definition of a set of classes of service (CoS) each corresponding to transmission constraints specifically established to support a given service. It is for example the case of the DiffServ (Differentiated Services) technology, as defined in particular in the standard documents RFC 2474 and 2475. Priorities are respectively allocated to the various classes of service and the intermediate items of equipment of a communication network that deal with congestion base themselves on these priorities in order to eliminate packets among those with the lowest priority and thus assist the transmission of packets among those having the highest priority. It is then the that the packets are colored, meaning that they are respectively marked by classes of service CoS and the network equipment that has to process the packets shall apply to the packets a QoS plan dependent on the classes of service CoS.

The most tricky communication links to be managed in terms of quality of service are the links based on wireless communication technologies since such links are subject to high variations of bandwidth according to changes in environment (signal attenuation, noise, interference, etc.). This is in particular the case with satellite links, the performances of which depend on climatic conditions (rain, fog, etc.).

It is therefore desirable, under these circumstances, to detect congestion situations, which may occur, on the same transmission link, vis-à-vis one or more classes of service and not occur vis-à-vis one or more other classes.

It is also desirable to provide a solution that is independent of a transport protocol (transport layer of the OSI (Open Systems Interconnection)) model used for transporting the data on the transmission link.

It is also desirable to provide a solution that complies with the network architecture recommendations of the OSI model.

It is also desirable to provide a solution that is simple to implement and in particular does not require any temporal synchronisation of the items of network equipment in the communication network.

SUMMARY

The present disclosure relates to a method for managing congestion on a transmission link from a first item of network equipment to a second item of network equipment in a packet communication network. The first item of network equipment is associated with a first congestion detection application and a second item of network equipment is associated with a second congestion detection application, and the second application implements, conjointly with the first application, a congestion control mechanism per class of service on the transmission link in which the second application performs the following steps, for at least one class of service: receiving, for each the class of service, a first control message coming from the first congestion detection application, the first control message including information representing a first volume of data colored by the class of service and transmitted by the first item of network equipment up to a first instant; receiving, for each the class of service, a second control message coming from the first congestion detection application, the second control message including information representing a second volume of data colored by the class of service and transmitted by the first item of network equipment up to a second instant; determining a first divergence between the first volume of data and the second volume of data; on reception of each first control message, obtaining information representing a third volume of data colored by the class of service and received by the second item of network equipment via the transmission link up to a third instant; on reception of each second control message, obtaining information representing a fourth volume of data colored by the class of service and received by the second item of network equipment via the transmission link up to a fourth instant; determining, for each class of service, a second divergence between the third volume of data and the fourth volume of data; and generating or not, for each class of service, an alarm signal representing congestion on the transmission link of the data colored by the class of service, according to a difference between the first divergence and the second divergence for the class of service.

In an embodiment, the first congestion detection application performs the following steps: transmitting each first control message to the second application, each first control message being colored with the class of service for which the first message is intended; and transmitting each second control message to the second application, each second control message being colored with the class of service for which the second message is intended.

In an embodiment, the first congestion detection application obtains the information representing the first volume and the information representing the second volume from the first item of network equipment by sending messages colored with the class of service having the highest priority; and the second congestion detection application obtains the information representing the third volume and the information representing the fourth volume from the second item of network equipment by sending messages colored with the class of service having the highest priority.

In an embodiment, each first message and each second message comprises a network level header for coloring the message with a class of service, and each first message and each second message includes an application level message payload including information representing the class of service.

In an embodiment, the first congestion detection application transmits control messages in sequence, and the second congestion detection application performs the following steps: making a comparison, for each class of service, between the difference between the first divergence and the second divergence with a predefined threshold for a plurality of pairs of control messages received; and deciding to generate an alarm signal for congestion on the transmission link for a class of service, when the difference between the first divergence and the second divergence is greater, for the class of service, than the predefined threshold for a number $N \geq 1$ of successive pairs.

In an embodiment, the second application implements, conjointly with the first application, a global congestion control mechanism on the transmission link, in which the second application performs the following steps: receiving a first general control message coming from the first congestion detection application, the first general control message including information representing a fifth volume of data transmitted by the first item of network equipment up to a fifth instant, independently of a coloring of the transmitted data; receiving a second general control message coming from the first congestion detection application, the second general control message including information representing a sixth volume of data transmitted by the first item of network equipment up to a sixth instant, independently of a coloring of the transmitted data; determining a third divergence between the fifth volume of data and the sixth volume of data; on reception of each first general control message, obtaining information representing a seventh volume of data received by the second item of network equipment via the transmission link up to a seventh instant, independently of a coloring of the received data; on reception of each the second general control message, obtaining information representing an eighth volume of data received by the second item of network equipment via the transmission link up to an eighth instant, independently of a coloring of the received data; determining a fourth divergence between the seventh volume of data and the eighth volume of data; and generating or not an alarm signal representing global congestion on the transmission link, according to a difference between the third divergence and the fourth divergence.

In an embodiment, the first and second applications receive an instruction to activate the global congestion control mechanism on the transmission link, and the second application generates an alarm signal representing a breakdown in the transmission link when a timer of predefined duration elapses without receiving a general control message.

In an embodiment, the second application implements, conjointly with the first application, a mechanism for checking improvement in the transmission conditions on the transmission link during which the congestion control mechanism per class of service is stopped and in which the second application performs the following steps, for at least one class of service: receiving, coming from the first application, for each class of service, a stream of test packets colored with the class of service; determining, for each stream received, a packet loss rate on the transmission link; and generating a loss report, for each class of service, including information representing the loss rate.

In an embodiment, in the context of the mechanism for checking improvement in the transmission conditions on the transmission link, the first application performs the following step: generating the stream of test packets in the form of a sequence of test packets for each class of service, each first and/or each last packet in the sequence being duplicated a predefined number of times.

In an embodiment, an alarm management center enforces a more restrictive quality of service plan in the packet communication network according to alarm signals generated by the second application, the alarm management center instructs the first and second applications to implement the mechanism for checking improvement in the transmission conditions on the transmission link after application of the more restrictive quality of service plan, and the alarm management center enforces a less restrictive quality of service plan in the packet communication network according to loss reports generated by the second application in the context of the mechanism for checking improvement in the transmission conditions on the transmission link.

In an embodiment, each message exchanged between the alarm management center and the first and second applications are colored with the class of service having the highest priority.

The present disclosure also relates to a method for managing congestion on a transmission link from a first item of network equipment to a second item of network equipment in a packet communication network, such that the first item of network equipment is associated with a first congestion detection application and the second item of network equipment is associated with a second congestion detection application, and such that the first application implements, conjointly with the second application, a congestion control mechanism per class of service on the transmission link in which the first application performs the following steps, for at least one class of service: transmitting, for each the class of service, a first control message to the second application, each first control message being colored with the class of service for which the first message is intended and including information representing a first volume of data colored by the class of service and transmitted by the first network equipment up to a first instant; and transmitting, for each the class of service, a second control message to the second congestion detection application, each second control message being colored with the class of service for which the second message is intended and including information representing a second volume of data colored by the class of service and transmitted by the first item of network equipment up to a second instant.

The present disclosure also relates to a device (first device) aimed at being used in the context of management of congestion on a transmission link from a first item of network equipment to a second item of network equipment in a packet communication network, such that, the first item of network equipment being associated with a first congestion detection application and the second item of network equipment being associated with a second congestion detection application, the device implements the second application and, for at least one class of service, includes: a receiver for receiving, for each the class of service, a first control message coming from the first congestion detection application, the first control message including information representing a first volume of data colored by the class of service and transmitted by the first item of network equipment up to a first instant; receiver for receiving, for each the class of service, a second control message coming from the first congestion detection application, the second control message including information representing a second volume of data colored by the class of service and transmitted by the first item of network equipment up to a second instant; a device or system for determining a first divergence between the first volume of data and the second volume of data; a first obtaining device or system for obtaining information representing a third volume of data colored by the class of service and received by the second item of network equipment via the transmission link up to a third instant, the first obtaining a device or system being implemented on reception of each first control message; a second obtaining device or system for obtaining information representing a fourth volume of data colored by the class of service and received by the second item of network equipment via the transmission link up to a fourth instant, the second obtaining device or system being implemented on reception of each second control message; a device or system for determining, for each class of service, a second divergence between the third volume of data and the fourth volume of data; and a device or system for generating or not, for each class of service, an alarm signal representing congestion on the transmission link of the data colored by the class of service, according to a difference between the first divergence and the second divergence for the class of service.

The present disclosure also relates to a device (second device) aimed at being used in the context of management of congestion on a transmission link from a first item of network equipment to a second item of network equipment in a packet communication network, such that, the first item of network equipment being associated with a first congestion detection application and the second item of network equipment being associated with a second congestion detection application, the device implements the first application and, for at least one class of service, includes: a device or system for transmitting, for each the class of service, a first control message intended for the second application, each first control message being colored with the class of service for which the first message is intended and including information representing a first volume of data colored by the class of service and transmitted by the first item of network equipment up to a first instant; and a device or system for transmitting, for each the class of service, a second control message intended for the second congestion detection application, each second control message being colored with the class of service for which the second message is intended and including information representing a second volume of data colored by the class of service and transmitted by the first item of network equipment up to a second instant.

The present disclosure also relates to a communication system including at least one first device as defined above and at least one second device as defined above, so that the first application implemented by each first device is paired with the second application implemented by each second device so as to detect congestions on a transmission link from a first item of network equipment associated with the first application to a second item of network equipment associated with the second application.

BRIEF DESCRIPTION OF THE DRAWINGS

The features of the present disclosure mentioned above, as well as others, will emerge more clearly from a reading of the following description of an example embodiment, the description being given in relation to the accompanying drawings, among which.

DETAILED DESCRIPTION

Figure 1:
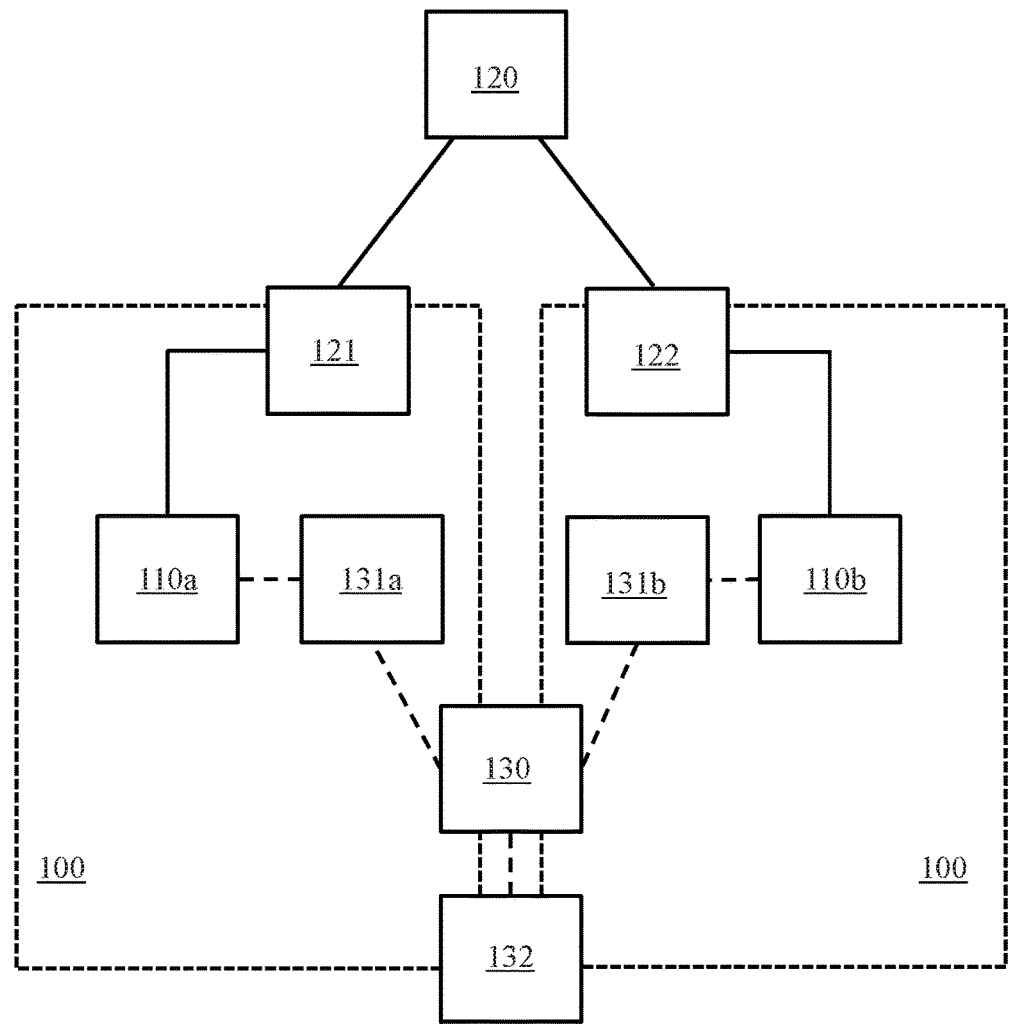
FIG. 1 schematically illustrates a first communication system in which the present disclosure may be implemented.

FIG. 1 schematically illustrates a first communication system in which the present disclosure may be implemented. The first communication system is a packet communication system based preferentially on IP (Internet Protocol) technology.

The first communication system comprises a first item of network equipment 110a and a second item of network equipment 110b interconnected by a satellite link. The satellite link is provided thanks to a first item of transceiver equipment 121 connected to the first network equipment 110a and a second item of transceiver equipment 122 connected to the second item of network equipment 110b, the first 121 and second 122 items of transceiver equipment communicating with each other via a satellite 120. The first 121 and second 122 items of transceiver equipment include respectively modems and antennas for implementing wireless communication via the satellite 120. Other types of communication technology can be used for implementing a transmission link from the first item of network equipment 110a to a second item of network equipment 110b, and vice-versa, such as for example the wired or wireless technologies previously mentioned. The transmission link may also include one or more other items of network equipment, in a way that is transparent for the first 110a and second 110b items of network equipment.

Figure 2:
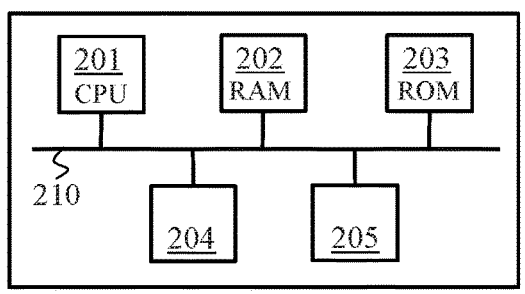
FIG. 2 schematically illustrates an example of hardware architecture of at least one item of equipment in the first communication system.

A plurality of communication domains may exist in the same communication system. A single communication domain 100 is depicted in FIG. 1, whereas a plurality of communication domains are depicted in FIG. 2. To mark the boundary between communication domains, encryption-decryption devices are used to make the communication domains hermetic with respect to one another.

Items of terminal equipment connected to the first item of network equipment 110a, optionally via one or more other items of network equipment, can thus communicate with other items of terminal equipment connected to the second item of network equipment 110b, also optionally via one or more other items of network equipment. These items of terminal equipment can thus exchange data according to various classes of service CoS, benefitting from the QoS plan applied in the communication domain 100.

The transmission link from the first item of network equipment 110a to this second item of network equipment 110b, and the transmission link from the second item of network equipment 110b to the first item of network equipment 110a, are subject to variations in transmission conditions, which may imply congestion situations for data streams according to classes of services associated with the data streams. Other transmission links in the first communication system may be affected by such variations in transmission conditions, which requires monitoring each of these transmission links in order to detect and manage such congestion situations. Consider hereinafter, by way of illustration, that the transmission link from the first item of network equipment 110a to the second item of network equipment 110b is thus to be monitored.

In the context of the present disclosure, each item of network equipment at one end of a communication link to be monitored is associated with a congestion detection application (CDA). Such an application is therefore of level seven (application layer) in the OSI model. The CDA application associated with an item of network equipment may be implemented by the item of network equipment or by a separate machine in the same communication domain 100 as the item of network equipment. In the latter case, the CDA application preferentially uses the SNMP protocol (Simple Network Management Protocol) for communicating with the item of network equipment with which the CDA application is associated. Other methods for communication by messages may be used, based for example on an application programming interface (API) in a model of the REST (REpresentational State Transfer) type. In an embodiment, the messages exchanged between each CDA application and the item of network equipment associated with the CDA application are colored with the class of service CoS having the highest priority, e.g. using the DSCP (DiffServ Code-Point, as defined in the standard document RFC 2474) service class code of type CS7.

To enable detecting improvements in transmission conditions on the transmission link to be monitored, the CDA application is situated on the same side of the transmission link to be monitored as the item of network equipment with which the CDA application is associated.

Thus, in order to monitor the transmission link from the first item of network equipment 110a to the second item of network equipment 110b, the first item of network equipment 110a is associated with a first CDA application 131a and the second item of network equipment 110b is associated with a second CDA application 131b. The first CDA application 131a is adapted for obtaining, from the first item of network equipment 110a, information on volume of data to be transmitted by the first item of network equipment 110a over the transmission link to be monitored, and this for one of more predetermined classes of service CoS. The first CDA application 131a is further adapted for transmitting the information to the second CDA application 131b, and the second CDA application 131b is adapted for receiving the information transmitted by the first CDA application 131a. The second CDA application 131b is further adapted for obtaining information on volume of data received by the second item of network equipment 110b via the transmission link to be monitored, and this for the predetermined class or classes of service CoS. The second CDA application 131b is further adapted for calculating a first divergence in volume of such data transmitted by the first item of network equipment 110a and a second divergence in volume of such data received by the item of network equipment 110b, and to make a comparison of the first and second divergences. The second CDA application 131b is further adapted for generating or not congestion alarm signals for one or more classes of service CoS, according to the comparison. In this context, the behavior of the first CDA application 131a is detailed below in relation to FIG. 5, and the behavior of the second CDA application 131b is detailed below in relation to FIG. 6.

Detecting congestion situations for one or more predefined classes of service enables determining at what moment to apply a more restrictive QoS plan. Such a QoS plan is preferentially applied by an Alarm Management Center (AMC) 130 or by a QoS Management Center (QoSMC) that the AMC center 130 keeps informed of the congestion situations.

The AMC center 130 belongs to the same communication domain 100 as the first 131a and second 131b CDA applications, and is adapted for receiving the alarm signals generated by the second CDA application 131b. The AMC center 130 is then adapted for enforcing QoS plan modifications according to the alarm signals generated by the second CDA application 131b. The AMC center 130 may be adapted to manage monitoring of a plurality of communication links of the first communication system. The AMC center 130 is thus adapted for receiving alarm signals from a plurality of CDA applications and for enforcing QoS plan modifications according to the alarm signals generated by the plurality of CDA applications.

In an embodiment, to enable detecting breakdown situations on the transmission link to be monitored, the first CDA application 131a is adapted for obtaining, from the first item of network equipment 110a, information on volume of data transmitted by the first item of network equipment 110a on the transmission link to be monitored, this independently of the classes of service CoS used. The first CDA application 131b is further adapted for transmitting the information to the second CDA application 131b and the second CDA application 131b is adapted for receiving the information transmitted by the first CDA application 131a. The second CDA application 131b is further adapted for obtaining information on volume of data received by the second item of network equipment 110b via the transmission link to be monitored, this independently of the classes of service CoS used. The second CDA application 131b is further adapted for calculating a third divergence in volume of the data transmitted by the first item of network equipment 110a and a fourth divergence in volume of such data received by the second item of network equipment 110b, and for making a comparison of the third and fourth divergences. The second CDA application 131b is further adapted for generating or not congestion alarm signals for the transmission link independently of any class of service CoS, according to the comparison. The second CDA application 131b is further adapted for generating or not alarm signals regarding breakdown of the transmission link, when the second CDA application 131b does not receive the information from the first CDA application 131a during a predefined period of time. In this context, the behavior of the first CDA application 131a is detailed below in relation to FIG. 7, and the behavior of the second CDA application 131b is detailed below in relation to FIGS. 8 and 9.

In an embodiment, to enable detecting an improvement in the transmission conditions on the transmission link from the first item of network equipment 110a to the second item of network equipment 110b, the first CDA application 131a is adapted for creating and transmitting to the second CDA application 131b, via the transmission link to be monitored, a test packet stream for each class of service CoS for which congestion has previously been detected. The second CDA application 131b is then adapted for receiving each test packet stream transmitted by the first CDA application 131a and for determining a data loss rate in the context of the transmission of the stream via the transmission link to be monitored. The second CDA application 131b is then adapted for managing and transmitting to the AMC center 130 a test report including information representing the loss rate. The AMC center 130 is then adapted for receiving the test report and for applying QoS plan modifications according to the test report. Detecting situations of improvement in the transmission conditions for one or more predefined classes of service allows determining at which moment to apply a less restrictive QoS plan. In this context, the behavior of the first CDA application 131a is detailed below in relation to FIG. 10, and the behavior of the second CDA application 131b is detailed below in relation to FIG. 11, in a first embodiment; and the behavior of the first CDA application 131a is detailed below in relation to FIG. 12, and the behavior of the second CDA application 131b is detailed below in relation to FIG. 13, in a second embodiment.

In the case where the transmission to be monitored is the transmission link from the second item of network equipment 110b to the first item of network equipment 110a, the roles of the first 131a and second 131b CDA applications are reversed.

The first communication system may include a network management station (NMS) 132 for the communication domain 100 to which the first 110a and second 110b items of network equipment belong. The NMS station 132 is responsible for implementing the FCAPS (Fault, Configuration, Administration, Performance, Security) mechanisms in accordance with the ISO (International Organization for Standardization) network management model. The AMC center 130 may then be adapted to inform the NMS station 132 of alarm signals generated by the CDA applications of the communication domain 100. The NMS station 132 may also receive such alarm signals directly from the CDA applications of the communication domain 100 without passing through the AMC center 130. This enables a virtual operator of the first communication system to be alerted of detected congestion situations. The NMS station 132 may be responsible for activating and configuring the CDA applications of the first communication system, optionally via the AMC center 130. Such a configuration of the CDA applications includes a particular phase of associating each CDA application with an item of network equipment, and a phase of pairing the CDA applications in pairs in order to monitor a transmission link between the two items of network equipment with which the CDA applications are respectively associated.

A discovery protocol may be implemented to enable the AMC center 130, and optionally the NMS station 132, to discover the CDA applications existing in the first communication system.

In general terms, each item of network equipment with which a CDA application is associated is of the router, switch or modem type.

From a point of view of applying the QoS plan, the items of equipment implementing such CDA applications and the item of equipment implementing the AMC center are considered to be items of network equipment rather than application terminals. In this regard, they are not considered to be equipment managed by the QoS policy of the communication domain 100. In other words, the traffic that these items of equipment generate in the context of the implementation of the CDA application and AMC center functionalities, in particular with regard to the test packet streams, is not impacted by the QoS policy implemented in the communication domain 100 in order to deal with variations in transmission conditions. The packets used in the mechanisms detailed below can use a specific addressing, e.g. dedicated UDP (User Datagram Protocol) ports, which do not form part of the QoS plan.

FIG. 2 schematically illustrates an example of hardware architecture for implementing a CDA application and/or the AMC center 130 and/or the NMS station 132. Consider hereinafter that the hardware architecture example schematically depicted in FIG. 3 corresponds to a machine on which the second CDA application 131b is executed.

The machine on which the second CDA application 131b is executed then includes, connected by a communication bus 210: a processor or CPU (Central Processing Unit) 201; a random access memory RAM 202; a read only memory ROM 203; a storage unit 204 or a storage medium reader, such as a SD (Secure Digital) card reader or a hard disk drive HDD; and a set of interfaces 205.

The set of interfaces 205 enables the machine on which the second CDA application 131b is executed to communicate with the second item of network equipment 110b with which the second CDA application 131b is associated and with the first CDA application 131a, as well as with the AMC center 130, and optionally with the NMS station 132.

The processor 201 is capable of executing instructions loaded into the RAM 202 from the ROM 203, from an external memory, from a storage medium, or from a communication network. When the machine on which the second CDA application 131b is executed is powered up, the processor 201 is capable of reading instructions from the RAM 202 and executing them. These instructions form a computer program causing the implementation, by the processor 201, of all or some of the algorithms and steps described below.

All or some of the algorithms and steps described below may thus be implemented in software form by the execution of a set of instructions by a programmable machine, such as a DSP (Digital Signal Processor) or a microcontroller, or be implemented in hardware form by a machine or a dedicated component, such as a FPGA (Field-Programmable Gate Array) or an ASIC (Application-Specific Integrated Circuit).

Figure 3:
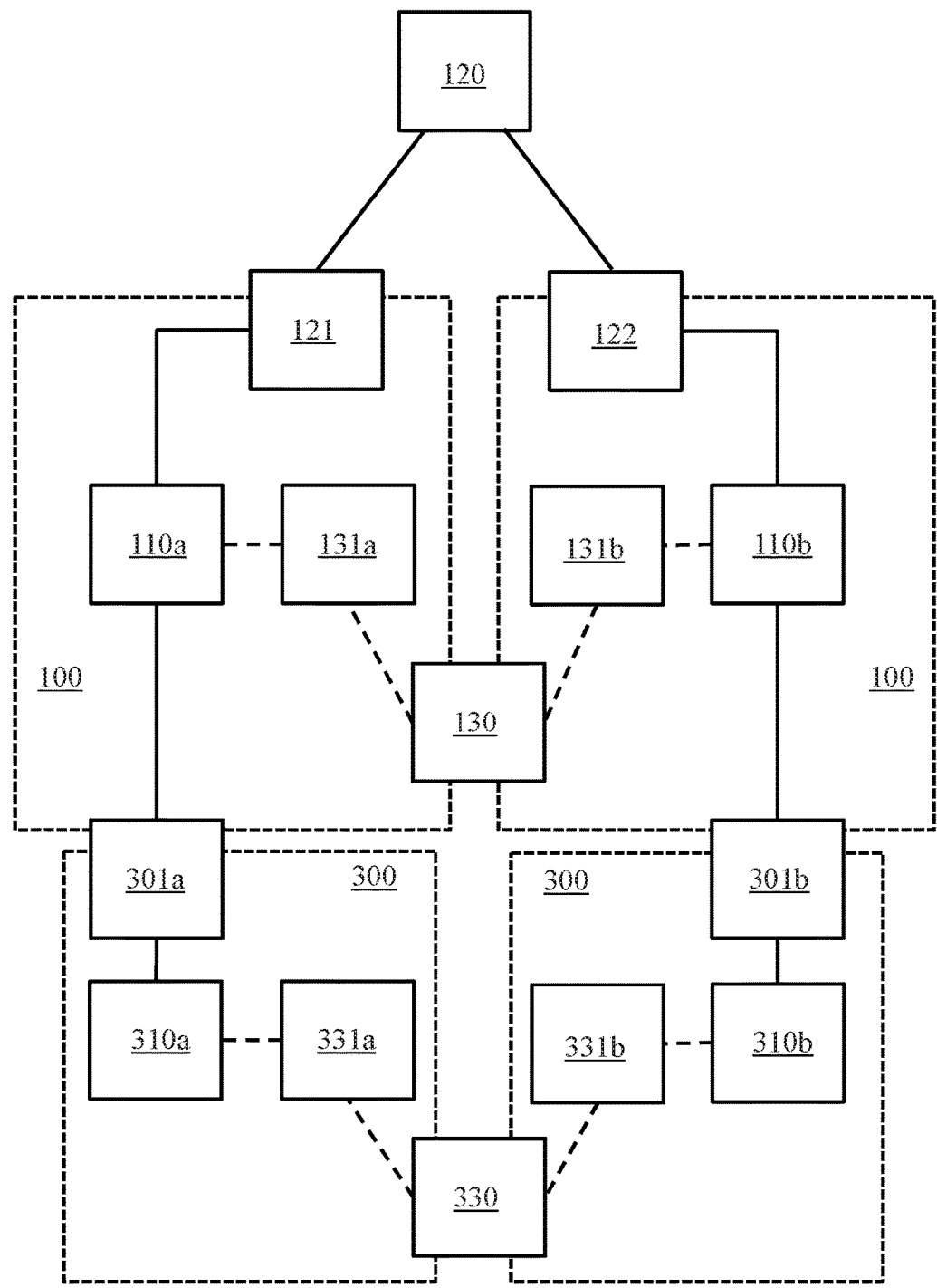
FIG. 3 schematically illustrates a second communication system in which the present disclosure may be implemented.

FIG. 3 schematically illustrates a second communication system in which the present disclosure may be implemented. The second communication system is also a packet communication system, preferentially based on IP technology.

The second communication system consists of or comprises a plurality of hermetic communication domains 100, 300. In other words, a device in the second communication system belonging to one communication domain cannot communicate with another device in the second communication system belonging to another communication domain.

The second communication system in FIG. 2 includes the first communication system in FIG. 1, the NMS station 132 not however being depicted in FIG. 2 for reasons of simplification.

The second communication system further includes a first encryption-decryption device 301a connected to the first item of network equipment 110a and a second encryption-decryption device 301b connected to the second item of network equipment 110b. The first 301a and second 301b encryption devices are paired and enable defining a communication domain 300 other than the communication domain 100 to which the first 110a and second 110b items of network equipment belong. The first 301a and second 301b encryption devices thus ensure that these communication domains are hermetic vis-à-vis each other.

The second communication system further includes a third item of network equipment 310a connected to the first encryption-decryption device 301a in the communication domain 300. The second communication system further includes a fourth item of network equipment 310b connected to the second encryption-decryption device 301b in the communication domain 300. Items of terminal equipment connected to the third item of network equipment 310a, optionally via one or more other items of network equipment, can thus communicate with other items of terminal equipment connected to the fourth item of network equipment 310b, also optionally via one or more other items of network equipment. These items of terminal equipment can thus exchange data with each other in accordance with various classes of service CoS, benefitting from the QoS plan applied in the communication domain 300. It should be noted that, since the communications domains 100 and 300 are hermetic vis-à-vis each other, independent QoS plans are applied thereto. The detection of congestion of service CoS in the communication domain 300 is then performed independently of the detection of congestion in the communication domain 100.

To enable detecting congestions on a transmission link and to detect an improvement in transmission conditions on the transmission link as aforementioned, the second communication system further includes a third CDA application 331a associated with the third item of network equipment 301a and a fourth CDA application 331b associated with the fourth item of network equipment 301b. As with the CDA applications 131a and 131b in the communication domain 100, the CDA applications 331a and 331b are paired. The CDA applications 331a and 331b behave vis-à-vis each other like respectively the CDA applications 131a and 131b.

The second communication system further includes an AMC center 330 in the communication domain 300. The AMC center 330 in the communication domain 300 acts vis-à-vis the CDA applications 331a and 331b in the same way as the AMC center 130 vis-à-vis the CDA applications 131a and 131b in the communication domain 100.

It should be noted that a larger number of communication domains can be implemented in the second communication system, each communication domain then having a plurality of CDA applications and an AMC center in order to detect congestions and to react to the congestions.

When a plurality of communication domains are present in the same communication system, each of these communication domains can implement an NMS station acting only on the communication domain to which the NMS station belongs.

In order to be able to detect congestion on a transmission link from a first item of network equipment to a second item of network equipment, whether in the context of the first communication system of FIG. 1 or in the context of the second communication system of FIG. 2, the CDA application associated with the first item of network equipment transmits, to the CDA application associated with the second item of network equipment, control messages representing a volume of data transmitted by the first item of network equipment.

Figure 4:
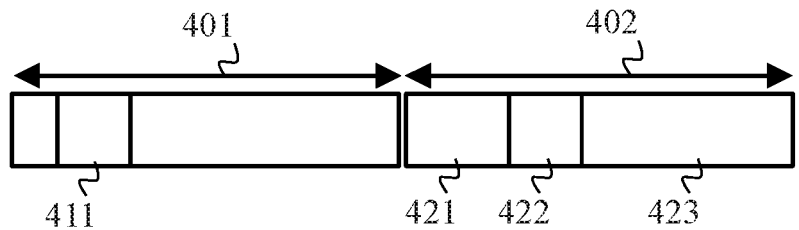
FIG. 4 schematically illustrates a format for control messages used for detecting congestion on a transmission link in the first or second communication system.

FIG. 4 schematically illustrates a format of such control messages.

The control message schematically shown in FIG. 4 is a frame comprising a header 401 of level three (network layer) in the OSI model and a message payload 402. More particularly, in the context of FIG. 4, the frame is of the IP type. The message header 401 then includes source IP address and destination IP address information enabling the control message to be routed in a packet communication network. The header 401 includes in particular a field 411, referred to as ToS (Type of Service), intended to specify a class of service CoS identifier with which the control message is associated. This class of service identifier is for example a DSCP code.

As detailed hereinafter, in order to detect congestion on a transmission link vis-à-vis a considered class of service CoS, a CDA application transmits a control message to the CDA application that is paired with it for monitoring the transmission link, the control message being transmitted in the considered class of service CoS. The field 411 is then filled with the identifier of the considered class of service CoS. In the case of a general control message, an identifier of the class of service CoS having the highest priority is used in the field 411. Taking the aforementioned DSCP example, the class of service code CS7 is used.

The payload of the message 402 includes a sequence field 421 serving to indicate a sequence number. At each new sending of a control message for a considered class of service CoS, the CDA application generating the message increments the value of a sequence counter by one unit, this value then being indicated in the sequence field 421.

The payload of the message 402 also includes a class of service field 422. This field repeats the value of the field 411 of the header 401. Indeed, the header 401 being a routing header, the header 401 is intended to be deleted by the level three (network layer) of the OSI model. The field 421 therefore enables the CDA application, situated at level seven (application layer) of the OSI model, to receive the class of service CoS information with which the control message is associated. In the case of a general control message, a specific identifier GS (Global Selector) is used for indicating that the message is a general control message.

The payload of the message 402 also includes a value field 423. The value field is intended to indicate information on volume of data transmitted by the item of network equipment with which the CDA application that generated the control message is associated.

The control messages are preferentially in accordance with the UDP protocol. A header relating to the UDP protocol is then interposed between the header 401 and the payload of the message 402. Other headers may be interposed between the header 401 and the payload of the message 402.

The payload of the message 402 may include other information. For example, the payload of the message 402 may include a field of the message type for indicating that the message is a control message. This allows using the same format for various types of message; test stream packets, as detailed below in relation to FIGS. 10 to 13, may then use a similar format. This may also allows, for a sequence of the test packets, marking a difference between a start-of-sequence test packet, an end-of-sequence test packet and an intermediate test packet.

The format of control messages in FIG. 4 is based on a header format of type IPv4, as defined in the standard document RFC 791. The format of control messages may also be based on a header format of the type IPv6, as defined in the standard document RFC 2460. The class of service CoS is then specified in a field, referred to as Traffic Class in the header to the IPv6 format.

Figure 5:
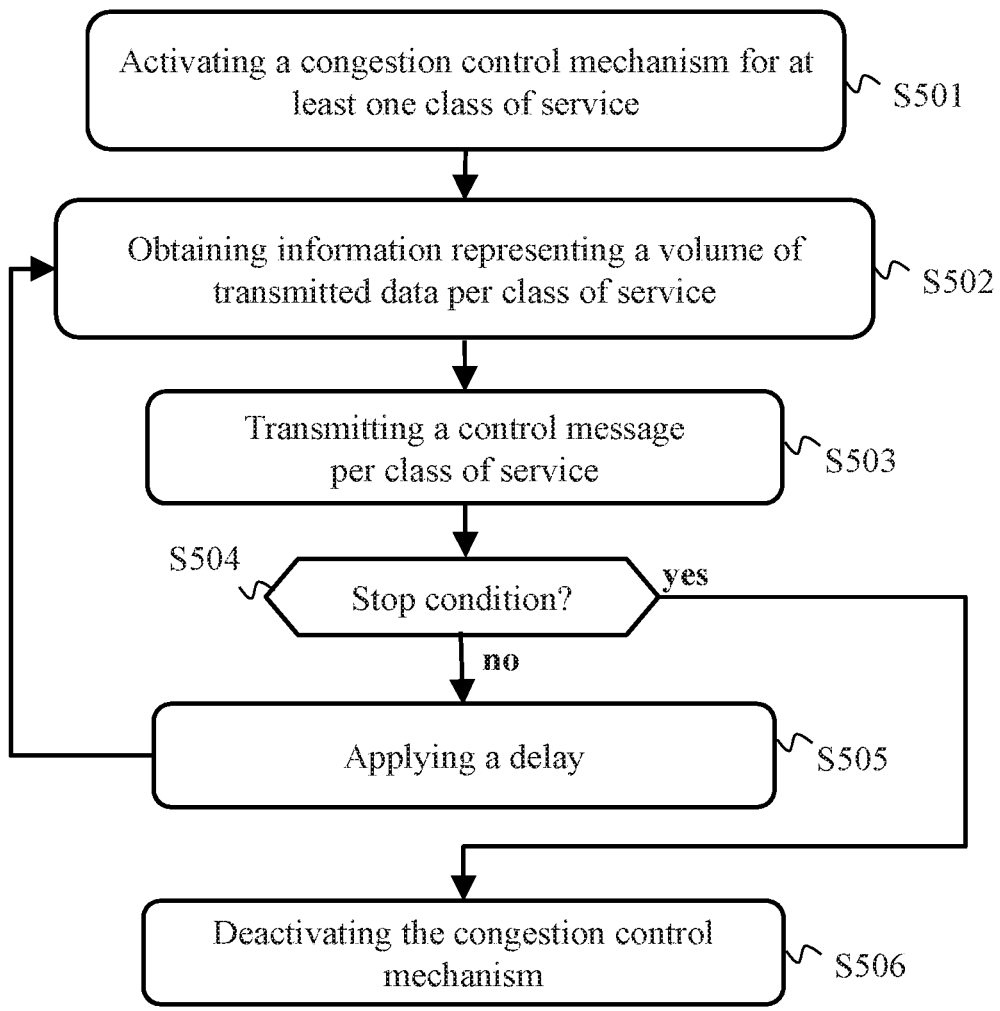
FIG. 5 schematically illustrates an algorithm for transmitting information relating to a volume of data transmitted per class of service via the transmission link.

FIG. 5 schematically illustrates an algorithm for transmitting information relating to a volume of data transmitted per class of service via a transmission link to be monitored. Consider that the algorithm in FIG. 5 is implemented by the first CDA application 131a, which is paired with the second CDA application 131b for monitoring the transmission link from the first item of network equipment 110a to the second item of network equipment 110b.

In a step S501, the first CDA application 131a receives an instruction to activate a congestion control mechanism for one or more classes of service CoS identified explicitly or implicitly by the activation instruction. The first CDA application 131a then activates the congestion control mechanism for each class of service CoS identified by the activation instruction. The activation instruction is transmitted to the first CDA application 131a by the AMC center 130.

In a following step S502, the first CDA application 131a obtains, from the first item of network equipment 110a, information representing a volume of data transmitted, from an instant $T_0$ that typically corresponds to an instant of initialisation of the first item of network equipment 110a, by the first item of network equipment 110a via the transmission link to be monitored for each class of service CoS identified by the activation instruction.

In a following step S503, the first CDA application 131a transmits to the second CDA application 131b a control message for each class of service CoS identified by the activation instruction. Adopting the format of FIG. 4, for each class of service CoS, the fields 411 and 422 are filled with an identifier, corresponding to the class of service CoS. Each control message serves to detect any congestions for a considered class of service CoS. Each control message will then experience the same transmission conditions via the transmission link to be monitored as the packets that are in the considered class of service CoS.

In a following step S504, the first CDA application 131a checks whether a stop condition is fulfilled. In other words, the first CDA application 131a checks whether an instruction to deactivate the congestion control mechanism has been received from the AMC center 130. If such is the case, a step S506 is performed; otherwise a step S505 is performed.

In the step S505, the first CDA application 131a waits until a predefined period has expired and reiterates the step S502. For example, the predefined period is fixed at five seconds.

In the step S506, the first CDA application 131a deactivates the congestion control mechanism for each class of service CoS identified in the activation instruction referred to at the step S501.

In a variant embodiment, the deactivation instruction may concern only a limited number of classes of service CoS among the classes of service CoS for which the control mechanism was previously activated. In this case, the first CDA application 131a deactivates the congestion control mechanism for each class of service CoS identified explicitly in the deactivation instruction, and repeats the step S502 for the remaining classes of service CoS.

Figure 6:
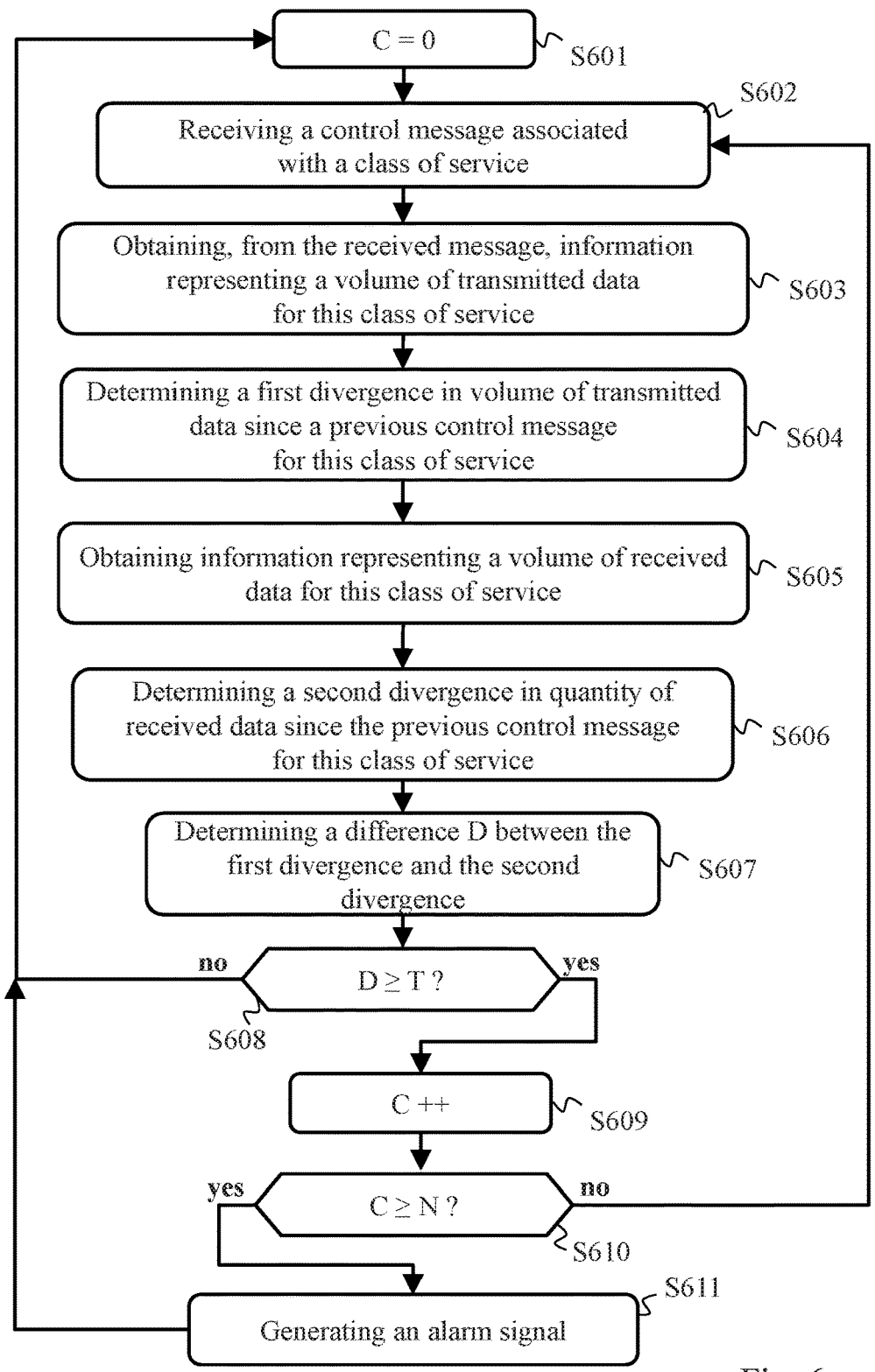
FIG. 6 schematically illustrates an algorithm for detecting congestion by class of service from information relating to the volume of data transmitted via the transmission link.

FIG. 6 schematically illustrates an algorithm for detecting congestion per class of service from information relating to the volume of data transmitted via the transmission link to be monitored. The algorithm in FIG. 6 is executed in conjunction with the algorithm in FIG. 5. More precisely, the algorithm in FIG. 6 is executed by the CDA application paired with the CDA application executing the algorithm in FIG. 5. Consider that the algorithm in FIG. 6 is implemented by the second CDA application 131b that is paired with the first CDA application 131a to monitor the transmission link from the first item of network equipment 110a to the second item of network equipment 110b.

In a step S601, the second CDA application 131b initializes a counter value C to "0". This counter is used to enable the second CDA application 131b to avoid sending false alarms (false positives) to the AMC center 130 by the use of a sliding window.

In a following step S602, the second CDA application 131b receives a control message associated with a class of service CoS. This message corresponds to a message sent by the first CDA application 131a at the step S503.

In a following step S603, the second CDA application 131b obtains, from the control message received at the step S602, information representing a volume of data transmitted by the first item of network equipment 110a associated with the first CDA application 131a on the transmission link to be monitored for the class of service CoS. The information representing a volume of transmitted data is associated with a sequence number S.

In a following step S604, the second CDA application 131b determines a first data volume divergence that corresponds to the difference between the volume of data transmitted as indicated in the sequence control message S for the class of service CoS and the volume of data transmitted as indicated in a previous control message for the class of service CoS. Preferentially, the previous control message has a sequence S−1 for the class of service CoS.

In a following step S605, the first CDA application 131a obtains from the second item of network equipment 110b information representing a volume of data received, from an instant $T'_0$ that corresponds typically to an instant of initialisation of the second item of network equipment 110b, by the second item of network equipment 110b via the transmission link to be monitored for the class of service CoS. Preferentially, the second CDA application 131b requires this information from the second item of network equipment 110b as soon as possible after reception of the control message.

In a following step S606, the second CDA application 131b determines a second data volume divergence that corresponds to the difference between the volume of received data as obtained following a sequence control message S for the class of service CoS and the volume of transmitted data as obtained following the previous control message for the class of service CoS.

In a following step S607, the second CDA application 131b determines an absolute difference D between the first divergence determined at the step S604 and the second divergence determined at the step S606. Such an approach based on divergences in volumes transmitted and received enables avoiding having to synchronise in time the actions performed by the CDA applications 131a and 131b in the context of congestion detection. Indeed, when no congestion occurs, the second item of the network equipment 110b is supposed to indicate that it has received more data than the first item of network equipment 110a has indicated that it has transmitted, since the first item of network equipment 110a continues a priori to send data during the time that the first CDA application 131a transmits the control message to the second CDA application 131b and since the second CDA application 131b obtains from the second item of network equipment 110b the information on the volume of received data.

In a following step S608, the second CDA application 131b compares the difference D with a first predefined threshold T. The first predefined threshold T is fixed so as to compensate for any lack of synchronism between the CDA applications 131a and 131b. Indeed, it is not necessary for the CDA applications 131a and 131b to be synchronised in time, and any jitter in the exchanges between the CDA applications 131a and 131b and the items of network equipment 110a and 110b that are associated with the CDA applications 131a and 131b shall be taken into account.

When the difference D is greater than or equal to the first predefined threshold T, the second CDA application 131b considers that a congestion situation is encountered for the class of service CoS on the transmission link to be monitored, and a step S609 is performed; otherwise this means that any congestion situation detected on reception of the sequence control message S−1 is a false positive and the step S601 is reiterated with resetting of the value of the counter C.

In the step S609, the second CDA application 131b increments the value of the counter C by one unit.

In a following step S610, the second CDA application 131b compares the value of the counter C with the predefined positive integer number N. When the value of the counter C is greater than or equal to the predefined positive integer number N, this means that congestion on the transmission link to be monitored for the class of service CoS is confirmed, and a step S611 is performed; otherwise the second CDA application 131b awaits a new control message for the class of service CoS and reiterates the step S602.

In the step S611, the second CDA application 131b generates an alarm signal. In other words, the second CDA application 131b transmits to the AMC center 130 a message representing a triggering of an alarm with regard to congestion on the transmission link to be monitored for the class of service CoS. Then the step S601 is reiterated.

In an embodiment, such an alarm signal comprises information representing a mean difference in volume of data transmitted and received, for each class of service CoS concerned, on a sliding window of size equal to N. Preferentially, this information is an estimation of the packet loss rate on the sliding window.

In an embodiment, the second CDA application 131b does however transmit any detected alarm to the AMC center 130, which is then responsible for filtering false positives by considering that a congestion situation is encountered for a considered class of service CoS when an alarm signal is received from the second CDA application 131b for a predefined positive integer number N of successive sequences of control messages for the considered class of service CoS. Thus, in general terms, N≥1, and defining N>1 allows relying on the sliding window for filtering false positives.

It should be noted that each control message is associated with a class of service CoS and that this control message experiences the same transmission conditions via the transmission link to be monitored as any packet that is transmitted via the transmission link to be monitored and which is colored by the class of service CoS. This allows having, from the determined volume divergences, a good estimation of the transmission conditions via the transmission link to be monitored for the considered class of service CoS. In addition, having an approach per class of service CoS enables detecting situations where only certain classes of service CoS experience congestions situations via the transmission link to be monitored, because of the priority management intrinsic to applying the QoS plan.

FIG. 6 schematically depicts an embodiment in which the congestion situation is confirmed N times before generating an alarm signal intended for the AMC center 130. In a preferential variant, the second CDA application 131b can generate an alarm if on average on the sliding window of size N the difference between volumes of data transmitted and received is greater than the first predefined threshold T.

Even if control messages are lost on the transmission link to be monitored, this does not prevent the second CDA application 131b from checking the difference in volumes of data transmitted and received. Indeed, the sliding window may be defined in terms of number of sequences to be taken into account, whether or not the sequences have consecutive numbers. In an embodiment, if the difference between the sequence number indicated in a control message received for a considered class of service CoS and the sequence number indicated in the last control message previously received for the considered class of service CoS is above a predefined threshold, the second CDA application 131b generates a specific alarm signal intended for the AMC center 130.

The previously described congestion control mechanism relies on an approach per class of service CoS. It may however be useful to have a general monitoring of the transmission link. Indeed, all the classes of service CoS for which the paired CDA applications monitor the transmission link may simultaneously experience congestion situations and it may be desirable to ensure that the transmission link is still active. Thus, in an embodiment, general control messages are then transmitted by the first CDA application 131a to the second CDA application 131b, as described below in relation to FIGS. 7 and 8.

Figure 7:
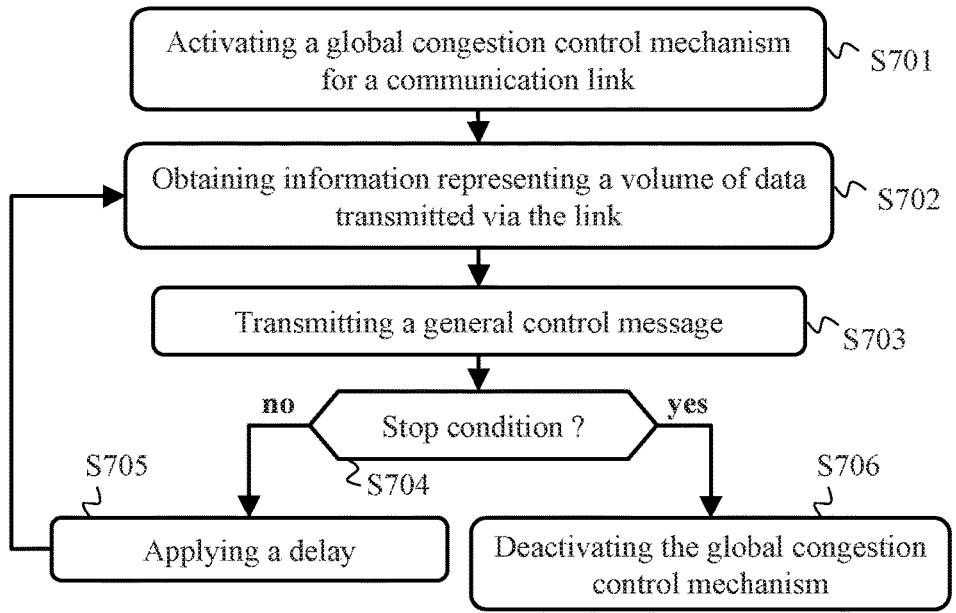
FIG. 7 schematically illustrates an algorithm for transmitting information relating to a global volume of data transmitted via the transmission link.

FIG. 7 schematically illustrates an algorithm for transmitting information relating to a global volume of data transmitted via a transmission link to be monitored. Consider that the algorithm in FIG. 7 is implemented by the first CDA application 131a, which is paired with the second CDA application 131b for monitoring the transmission link from the first item of network equipment 110a to the second item of network equipment 110b.

In a step S701, the first CDA application 131a receives an instruction to activate a global congestion control mechanism for the transmission link to be monitored. The first CDA application 131a then activates the global congestion control mechanism. The activation instruction is transmitted to the first CDA application 131a by the AMC center 130.

In a following step S702, the first CDA application 131a obtains, from the first item of network equipment 110a, information representing a volume of data transmitted since the instant $T_0$ by the first item of network equipment 110a via the transmission link to be monitored, independently of the classes of service CoS associated with these data.

In a following step S703, the first CDA application 131a transmits a general control message to the second CDA application. Adopting the format in FIG. 4, the field 411 is filled with an identifier corresponding to the class of service CoS having the highest priority so as to ensure the transmission, at one moment or another, of the general control message if the transmission link to be monitored is still active. The field 422 is filled with the specific identifier GS already mentioned.

In a following step S704, the first CDA application 131a checks whether a stop condition is fulfilled. In other words, the first CDA application 131a checks whether an instruction to deactivate the global congestion control mechanism has been received from the AMC center 130. If such is the case, a step S706 is performed; otherwise a step S705 is performed.

In the step S705, the first CDA application 131a waits until a predefined period has expired and reiterates the step S702. For example, the predefined period is fixed at five seconds.

In the step S706, the first CDA application 131a deactivates the global congestion control mechanism.

Figure 8:
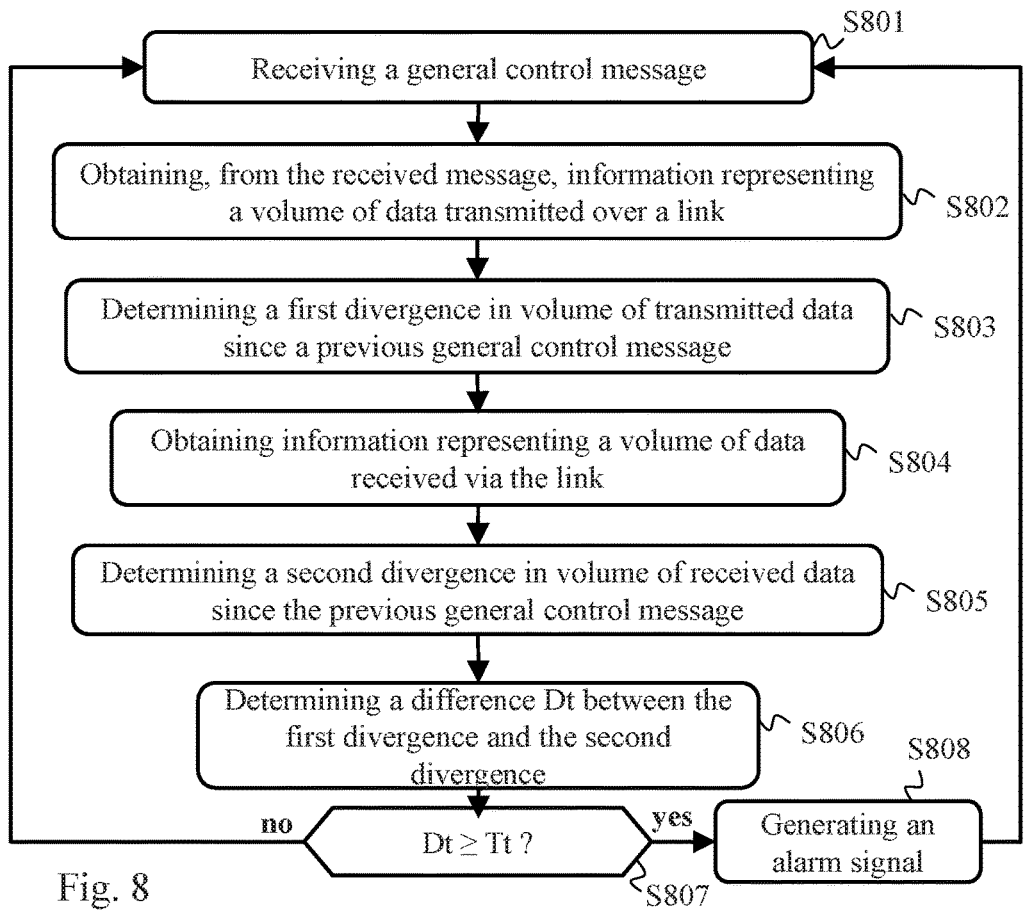
FIG. 8 schematically illustrates an algorithm for detecting global congestion on the transmission link from information relating to the global volume of data transmitted via the transmission link.

FIG. 8 schematically illustrates an algorithm for detecting global congestion of a transmission link from information relating to the global volume of data transmitted via the transmission link. The algorithm in FIG. 8 is executed in conjunction with the algorithm in FIG. 7. More precisely, the algorithm in FIG. 8 is executed by the CDA application paired with the CDA application executing the algorithm in FIG. 7. Consider that the algorithm in FIG. 8 is implemented by the second CDA application 131b that is paired with the first CDA application 131a in order to monitor the transmission link from the first item of network equipment 110a to the second item of network equipment 110b.

In a step S801, the second CDA application 131b receives a general control message. This message corresponds to the message sent by the first CDA application 131a at the step S703.

In a following step S802, the second CDA application 131b obtains, from the general control message received at the step S801, information representing a volume of data transmitted by the first item of network equipment 110a associated with the first CDA application 131a on the transmission link to be monitored, independently of any class of service CoS. The information representing a volume of transmitted data is associated with a sequence number S.

In a following step S803, the second CDA application 131b determines a third divergence in volume of data that corresponds to the difference between the volume of transmitted data as indicated in the general control message of sequence S and the volume of transmitted data as indicated in a previous general control message. Preferentially, the preceding general control message has a sequence number S−1.

In a following step S804, the second CDA application 131b obtains, from the second item of network equipment 110b, information representing a volume of data received since the instant $T_0$ by the second item of network equipment 110b via the transmission link to be monitored, independently of any class of service CoS. Preferentially, the second CDA application 131b requires this information from the second item of network equipment 110b as soon as possible after reception of the general control message.

In a following step S805, the second CDA application 131b determines a fourth divergence in volume of data that corresponds to the difference between the volume of received data as obtained following the general control message of sequence S and the volume of transmitted data as obtained following the general control message.

In a following step S806, the second CDA application 131b determines an absolute difference Dt between the third divergence determined at the step S803 and the fourth divergence determined at the step S805. As already mentioned, such an approach based on divergences in transmitted and received volumes enables avoiding having to synchronise in time the actions performed by the CDA applications 131a and 131b in the context of congestion detection.

In a following step S807, the second CDA application 131b compares the difference Dt with a second predefined threshold Tt. The second predefined threshold Tt is fixed so as to compensate for any lack of synchronism between the CDA applications 131a and 131b. When the difference Dt is greater than or equal to the second predefined threshold Tt, the second CDA application 131b considers that a congestion situation is encountered for the whole of the transmission link to be monitored and a step S808 is performed; otherwise this means that a congestion situation is encountered only for the classes of service CoS with the lowest priority, and the second CDA application 131b awaits a general control message in the step S801.

In the step S808, the second CDA application 131b generates an alarm signal. In other words, the second CDA application 131b transmits to the AMC center 130 a message representing a triggering of an alarm related to global congestion on the transmission link to be monitored. Then the step S801 is reiterated.

It should be noted that, unlike the algorithm in FIG. 6, the algorithm in FIG. 8 does not, for reasons of simplification, describe the sliding window intended to avoid triggerings of false positives. This sliding-window principle may however also be applied in the context of the algorithm in FIG. 8 so that the second CDA application 131b generates the alarm signal when a predefined positive integer number N' of successive sequences of general control messages shows global congestion of the transmission link to be monitored. Thus, in general terms, N'≥1, and defining N'>1 allows relying on the sliding window for filtering false positives. As in the context of the algorithm in FIG. 6, such a sliding window may be implemented by the AMC center 130.

The global congestion detection mechanism previously described in relation to FIGS. 7 and 8 is preferentially implemented at substantially the same frequency as the mechanism for detecting congestion per class of service CoS described in relation to FIGS. 5 and 6. In other words, the delays applied at the steps S505 and S705 are substantially the same.

The algorithm in FIG. 8 is triggered on instruction from the AMC center 130, as described below in relation to FIG. 9.

Figure 9:
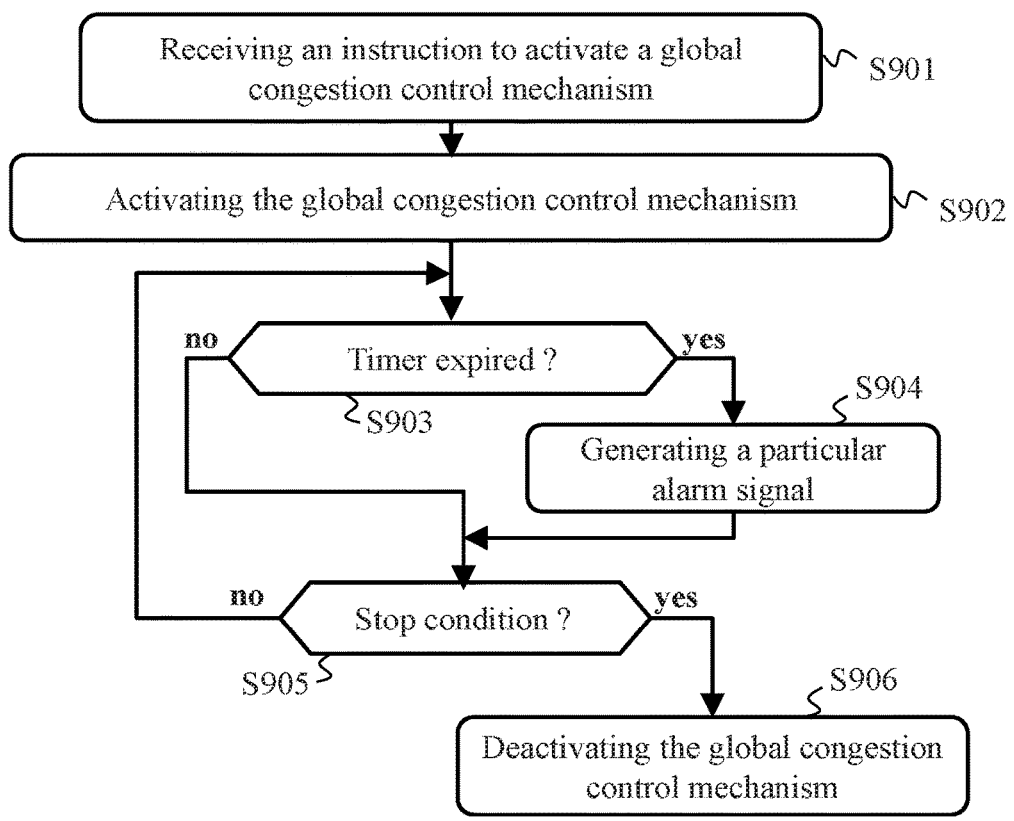
FIG. 9 schematically illustrates an algorithm for detecting a breakdown in the transmission link.

FIG. 9 schematically illustrates an algorithm for detecting a breakdown on a transmission link. The algorithm in FIG. 9 is implemented by the same CDA application as the algorithm in FIG. 8. Consider that the algorithm in FIG. 8 is implemented by the second CDA application 131b.

In a step S901, the second CDA application 131b receives, from the AMC center 130, an instruction to activate the global congestion control mechanism for the transmission link to be monitored.

In a following step S902, the second CDA application 131b activates the global congestion control mechanism, which has the effect of triggering the implementation of the algorithm in FIG. 8. The second CDA application 131b then initializes a timer of predefined duration. The timer is reinitialized whenever a control message is received by the second CDA application 131b for the transmission link to be monitored. The duration of the timer is fixed so as to be appreciably greater than the delay applied by the first CDA application 131a at the step S705. In a following step S903, the second CDA application 131b checks whether the timer has elapsed. If such is the case, a step S904 is performed; otherwise a step S905 is performed.

In the step S904, the second CDA application 131b considers that the transmission link to be monitored is broken since no general control message was received for the transmission link to be monitored before the timer has elapsed. The second CDA application 131b then generates a specific alarm signal for indicating that the transmission link to be monitored is broken. In other words, the second CDA application 131b transmits to the AMC center 130 a message representing a triggering of an alarm regarding breakdown of the transmission link to be monitored. Then the step S905 is performed.

In the step S905, the second CDA application 131b checks whether a stop condition is fulfilled. In other words, the second CDA application 131b checks whether an instruction to deactivate the global congestion control mechanism has been received from the AMC center 130. If such is the case, a step S906 is performed; otherwise the step S903 is reiterated.

In the step S906, the second CDA application 131b deactivates the global congestion control mechanism, which ends the implementation of the algorithm in FIG. 8.

In a variant embodiment, the algorithm in FIG. 8 is active continuously at the CDA application 131b. The algorithm in FIG. 8 then reacts on reception of a general control message. The algorithm in FIG. 9 is then simplified in that the second CDA application 131b initializes and activates the timer on instruction from the AMC center 130.

The algorithms in FIGS. 5 to 9 enable detecting congestion situations. As already mentioned, it is consequently expected that the AMC center 130 will enforce a new QoS plan suited to the transmission conditions that led to these congestion situations. After enforcement of this new QoS plan, it is expected that such congestion situations will no longer be encountered if the transmission conditions do not change. If these transmission conditions degrade once again, the algorithms in FIGS. 5 to 9 enable detecting new congestion situations related to this degradation of the transmission conditions. The algorithms in FIGS. 5 to 9 do however not enable detecting whether these transmission conditions have improved. A mechanism for checking improvement in transmission conditions is therefore preferentially implemented to enable detecting an improvement in the transmission conditions. The mechanism for checking improvement in transmission conditions is preferentially triggered for a class of service CoS in question when the AMC center 130 observes that no congestion alarm or quantity less than a predefined threshold congestion alarms is received for the class of service CoS during a period of predefined duration, after having checked that the transmission link to be monitored was not broken down.

A first embodiment of the mechanism for checking improvement in the transmission conditions is presented below in relation to FIGS. 10 and 11, and a second embodiment of the mechanism for checking improvement in the transmission conditions is presented below in relation to FIGS. 12 and 13.

Figure 10:
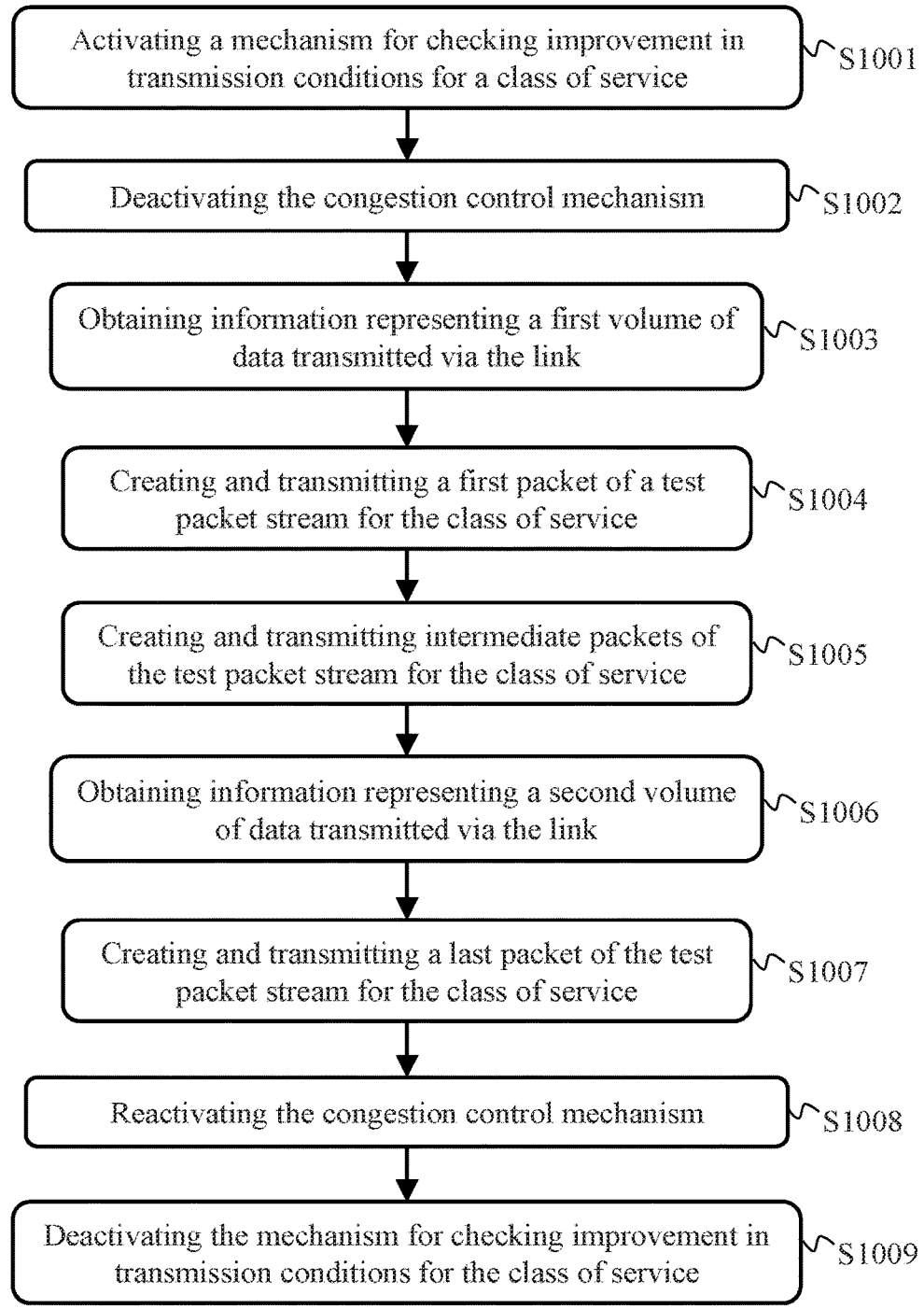
FIG. 10 schematically illustrates a first algorithm for transmitting a test data stream via the transmission link.

FIG. 10 schematically illustrates a first algorithm for transmitting a test data stream via a transmission link to be monitored. Consider that the algorithm in FIG. 10 is implemented by the first CDA application 131a that is paired with the second CDA application 131b for monitoring the transmission link from the first item of network equipment 110a to the second item of network equipment 110b.

In a step S1001, the first CDA application 131a receives an instruction to activate a mechanism for checking improvement in the transmission conditions on the transmission link to be monitored, for one or more classes of service CoS identified explicitly or implicitly by the activation instruction. The first CDA application 131a then activates the mechanism for checking improvement in the transmission conditions for each identified class of service CoS. The activation instruction is transmitted to the first CDA application 131a by the AMC center 130.

In a following step S1002, the first CDA application 131a deactivates the congestion control mechanism described previously in relation to FIGS. 5 and 7. This prevents the mechanism for checking improvement in the transmission conditions from unnecessarily generating congestion alarms that would not be representative of actual transmission conditions on the transmission link to be monitored.

Next, the first CDA application 131a creates and transmits a test packet stream for each identified class of service CoS. For a considered class of service CoS, the first CDA application 131a creates a test packet stream colored according to the considered class of service CoS. The size of the packets in the stream and the quantity of these packets are predefined according to the considered class of service CoS, according to the transmission conditions on the transmission that led to the QoS plan currently applied and according to a nominal load required for the considered class of service CoS on the transmission link.

The AMC center 130 preferentially supplies, in the activation instruction received by the first CDA application 131a at the step S1001, information on the transmission rate to be complied with in the context of the transmission of each stream. Either the number of packets in the sequence is predefined and known to the first CDA application 131a, or this number of packets is also supplied by the AMC center in the activation instruction. In a variant, information on the packet size of the stream and the quantity of these packets is supplied by the AMC center 130 in the activation instruction received by the first CDA application 131a at the step S1001.

The aim sought is then to increase the load on the transmission link for the considered class of service CoS in order to evaluate a loss rate for the stream, so as next to enable the AMC center 130 to determine whether the transmission conditions on the transmission link for the considered class of service CoS have improved.

In a following step S1003, the first CDA application 131a obtains from the first item of network equipment 110a information representing a first volume of data transmitted, since the instant $T_0$, by the first item of network equipment 110a via the transmission link to be monitored for each class of service CoS.

In a following step S1004, the first CDA application 131a creates and transmits to the second CDA application 131b the first packet of each test packet stream. The first packet in each stream is then a packet starting the corresponding test sequence. Each first packet comprises the information representing the first volume of data for the concerned class of service CoS.

In a following step S1005, the first CDA application 131a creates and transmits to the second CDA application 131b intermediate packets of each test packet stream. These packets are the to be "intermediate" in that the packets are neither test sequence start packets nor test sequence end packets.

In a following step S1006, the first CDA application 131a obtains from the first item of network equipment 110a information representing a second volume of data transmitted, since the instant $T_0$, by the first item of network equipment 110a via the transmission link to be monitored for each class of service CoS.

In a following step S1007, the first CDA application 131a creates and transmits to the second CDA application 131b the last packet of each test packet stream. The last packet of each stream is therefore a packet ending the corresponding test sequence. Each last packet comprises the information representing the second volume of data for the class of service CoS in question.

The packets in each of the streams are next filled with padding data in order to achieve the required sizes. The packets of each of the streams are preferentially in accordance with the UDP protocol. The payload of these packets includes information representing the class of service CoS in order to enable the second CDA application 131b to determine with which class of service CoS the packets are associated, as are the control messages already described in relation to FIG. 4. The payload of these packets also includes sequence number information enabling the second CDA application 131b, when the CDA application 131b receives such a packet, to determine what the position of the packet in the stream is.

In a preferential embodiment, the first packet in the stream is repeated a number $N_0 > 1$ of times, in order to ensure that the second CDA application 131b receives at least one copy of the first packet. A plurality of successive test packets then comprise the same sequence number.

In a preferential embodiment, the last packet in the stream is repeated a number $N_1 > 1$ of times, in order to ensure that the second CDA application 131b receives at least one copy of the last packet. In this case also, a plurality of successive test packets then comprise the same sequence number.

To enable the second CDA application 131b to distinguish the first packet in the test stream, the first CDA application 131a may rely on a packet type field specified in the payload of each packet in the stream. A value representing a test sequence start packet, a value representing a test sequence end packet and a value representing a test sequence intermediate packet can thus be defined. In a variant, the first CDA application 131a may use a particular sequence number for beginning the test sequence, e.g. null sequence number. By knowing in advance the quantity of packets in the test sequence, the second CDA application 131b is then capable of determining what the sequence number of the last packet in the stream shall be.

If the second CDA application 131b receives a plurality of test packets with the same sequence, the CDA application 131b relies on the first copy received to make loss rate computations.

Once each of the test packet streams have been transmitted, the first CDA application 131a, in a step S1008, reactivates the congestion control mechanism described previously in relation to FIGS. 5 and 7 and, in a step S1009, deactivates the mechanism for checking improvement in the transmission conditions for the transmission link to be monitored.

Figure 11:
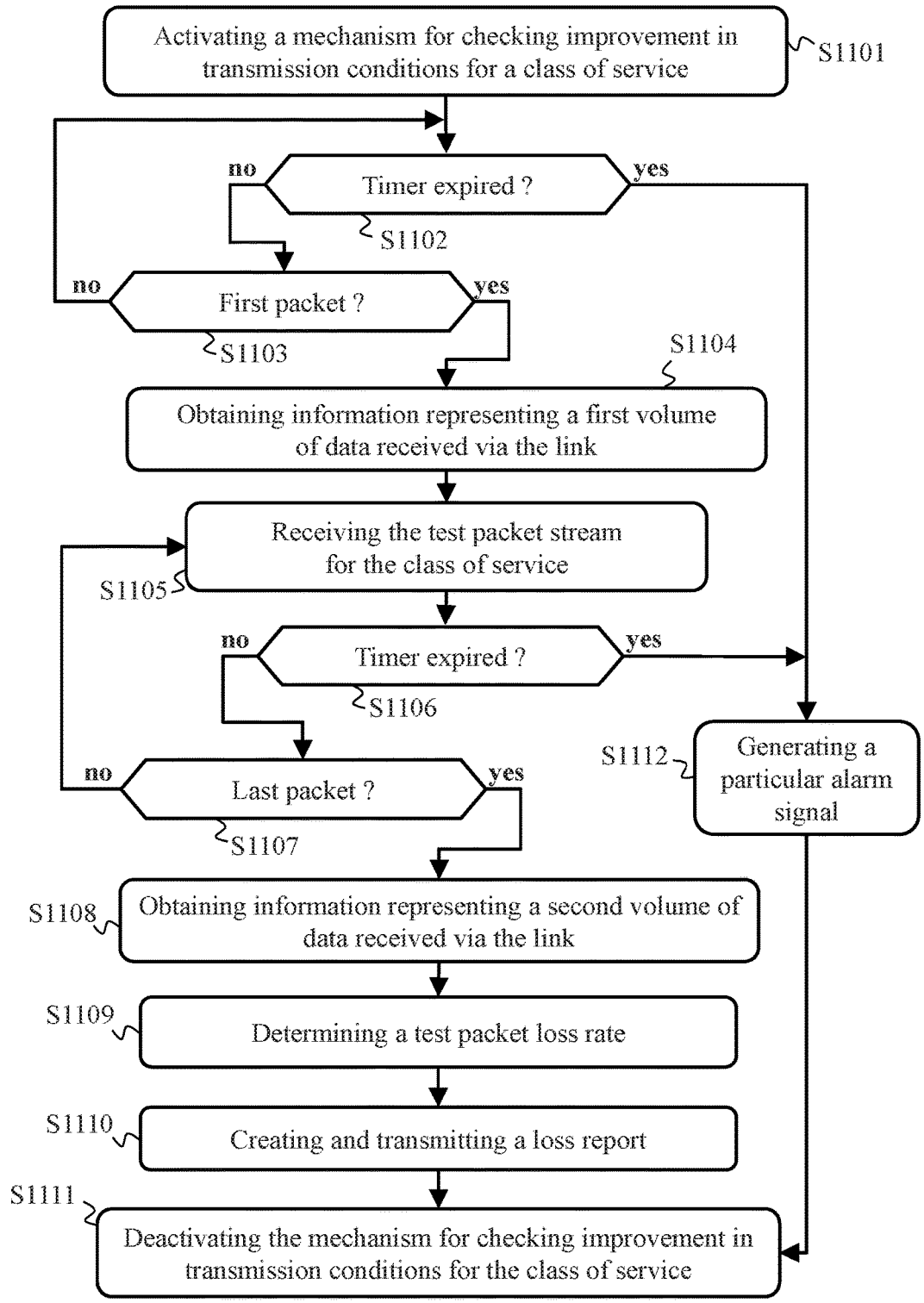
FIG. 11 schematically illustrates a first algorithm for detecting improvement in transmission conditions for a class of service on the transmission link, from information relating to the test data stream.

FIG. 11 schematically illustrates a first algorithm for detecting improvement in transmission conditions per class of service CoS on a transmission link to be monitored, from information relating to the test data stream. The algorithm in FIG. 11 is implemented in conjunction with the algorithm in FIG. 10. The algorithm in FIG. 11 is implemented for each class of service CoS to which the algorithm in FIG. 10 relates. Consider that the algorithm in FIG. 11 is implemented by the second CDA application 131b that is paired with the first CDA application 131a in order to monitor the transmission link from the first item of network equipment 110a to the second item of network equipment 110b.

In a step S1101, the second CDA application 131b receives an instruction to activate the mechanism for checking improvement in the transmission conditions on the transmission link to be monitored, for a class of service CoS identified explicitly or implicitly by the activation instruction. The second CDA application 131b then activates the mechanism for checking improvement in the transmission conditions for the class of service CoS. The activation instruction is transmitted to the second CDA application 131b by the AMC center 130.

The AMC center 130 preferentially supplies, in the activation instruction received by the second CDA application 131b at the step S1101, transmission rate information that the first CDA application 131a will comply with in the context of the transmission of the corresponding test packet stream. Either the number of packets in the sequence is predefined and known to the second CDA application 131b, or this number of packets is also supplied by the AMC center in the activation instruction. In a variant, information on the size of the packets in the stream and the quantity of these packets is supplied by the AMC center 130 in the activation instruction received by the second CDA application 131b at the step S1101.

The second CDA application 131b then initializes, for the considered class of service CoS, a timer of predefined duration appreciably longer than the time for transferring a packet of the stream from the first CDA application 131a to the second CDA application 131b. The objective of this timer is to detect congestion situations in which no copy of the first packet of the stream is received.

In a following step S1102, the second CDA application 131b checks whether the timer has elapsed. If such is the case, a step S1112 is performed; otherwise a step S1103 is performed.

In the step S1103, the second CDA application 131b determines whether a copy of the first packet of the stream is received. As already indicated, this first packet may be identified thanks to a type field or by virtue of a predefined sequence number. When a copy of the first packet in the stream is received, a step S1104 is performed; otherwise the step S1102 is reiterated.

In the step S1104, the second CDA application 131b obtains, from the second item of network equipment 110b, information representing a first volume of data received since the instant $T'_0$ by the second item of network equipment 110b via the transmission link to be monitored, for the considered class of service CoS. Preferentially, the second CDA application 131b requests this information from the second item of network equipment 110b as soon as possible after reception of the copy of the first packet of the test stream.

The second CDA application 131b reinitializes the timer with a predefined duration appreciably longer than the time for transferring the test packet stream from the first CDA application 131a to the second CDA application 131b.

In a following step S1105, the second CDA application 131b awaits new packets in the stream. The intermediate packets in the data stream are discarded by the second CDA application 131b; only the sequence end packet (i.e. a copy of the last packet in the stream) is here of interest to the second CDA application 131b.

In a following step S1106, the second CDA application 131b checks whether the timer has elapsed. If such is the case, the step S1112 is performed; otherwise a step S1107 is performed.

In the step S1107, the second CDA application 131b determines whether a copy of the last packet of the stream is received. As already indicated, this last packet can be identified by virtue of a type field or by virtue of a predetermined sequence number. When a copy of the last packet of the stream is received, a step S1108 is performed; otherwise the step S1105 is reiterated.

In the step S1108, the second CDA application 131b obtains, from the second item of network equipment 110b, information representing a second volume of data received since the instant $T_0$ by the second item of network equipment 110b via the transmission link to be monitored, for the considered class of service CoS. Preferentially, the second CDA application 131b requests this information from the second item of network equipment 110b as soon as possible after reception of the copy of the last packet of the test stream.

The second CDA application 131b is then in a position, in a following step S1109, to determine a test packet loss rate for the considered class of service CoS. To do this, the second CDA application 131b determines a first divergence between the volume of data indicated by the first CDA application 131a in the first packet of the stream at the step S1004 and the volume of data indicated by the first CDA application 131a in the last packet of the stream at the step S1007. In addition, the second CDA application 131b determines a second divergence between the first volume of data obtained at the step S1104 and the second volume of data obtained at the step S1108. From these first and second divergences, the second CDA application 131a is capable of estimating a loss rate for the data stream. It is considered that the losses are, substantially, equitably distributed between the various streams that pass over the transmission link to be monitored and that are colored by the class of service CoS.

In a following step S1110, the second CDA application 131b creates and transmits to the AMC center 130 a loss report representing, for the considered class of service CoS, the loss rate. The second CDA application 131b may indicate in the test report the volumes of data obtained at the steps S1004, S1007, S1104 and S1108, and/or the first and second divergences calculated from these volumes.

In a following step S1111, the second CDA application 131b receives an instruction to deactivate the mechanism for checking improvement in the transmission conditions on the transmission link to be monitored for the considered class of service CoS. The second CDA application 131b then deactivates the mechanism for checking improvement in the transmission conditions for the considered class of service CoS. The deactivation instruction is transmitted to the second CDA application 131b by the AMC center 130. In a variant, the second CDA application 131b decides to deactivate the mechanism for checking improvement in the transmission conditions after having transmitted the loss report to the AMC center 130. The algorithm in FIG. 11 is ended following the step S1111.

In the step S1112, the second CDA application 131b generates a specific alarm signal intended for the AMC center 130, and the step S1111 is performed.

Thus, according to the loss report transmitted by the second CDA application 131b, the AMC center 130 is capable of determining whether the transmission conditions on the transmission link have improved for the considered class of service CoS and of deciding, if the conditions have improved, to enforce a new less restrictive QoS plan.

Figure 12:
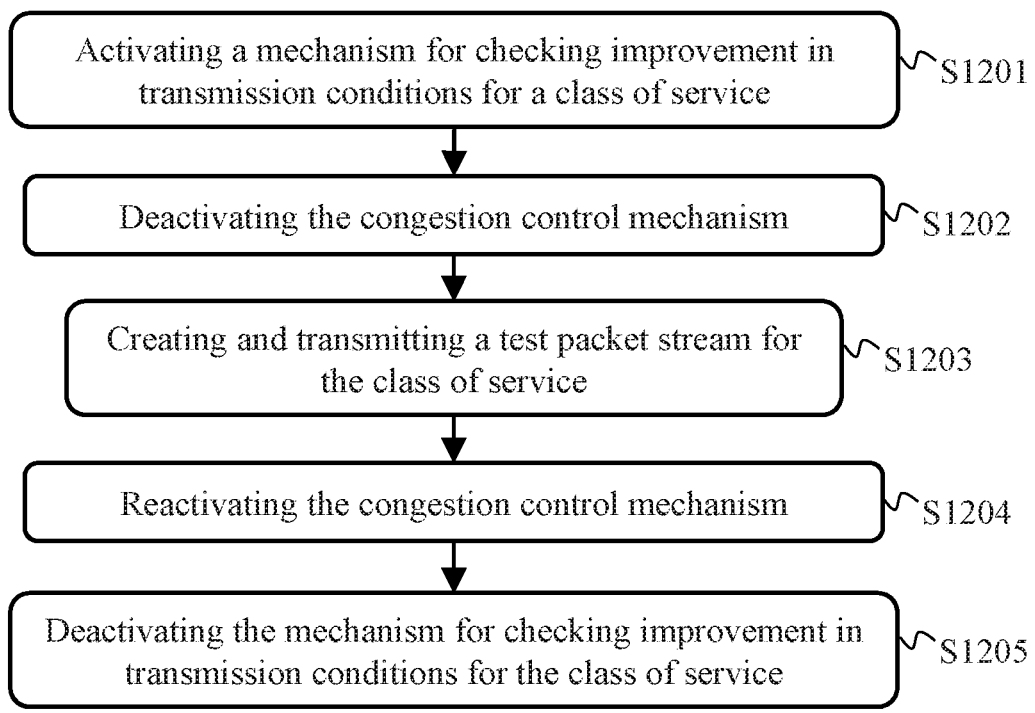
FIG. 12 schematically illustrates a second algorithm for transmitting a test data stream via the transmission link.

FIG. 12 schematically illustrates a second algorithm for transmitting a test data stream via a transmission link to be monitored. Consider that the algorithm in FIG. 12 is used by the first CDA application 131a that is matched with the second CDA application 131b for monitoring the transmission link from the first item of network equipment 110a to the second item of network equipment 110b.

In a step S1201, the first CDA application 131a receives an instruction to activate a mechanism for checking improvement in the transmission conditions on the transmission link to be monitored, for one or more classes of service CoS identified explicitly or implicitly by the activation instruction. The first CDA application 131a then activates the mechanism for checking improvement in the transmission conditions for each class of service CoS identified. The activation instruction is transmitted to the first CDA application 131a by the AMC center 130.

In a following step S1202, the first CDA application 131a deactivates the congestion control mechanism described previously in relation to FIGS. 5 and 7. This avoids the mechanism for checking improvement in the transmission conditions unnecessarily generating congestion alarms that would not represent actual transmission conditions on the transmission link to be monitored.

In a following step S1203, the first CDA application 131a creates and transmits a test packet stream for each class of service CoS identified. For a considered class of service CoS, the first CDA application 131a creates a stream of test packets colored according to the considered class of service CoS. The size of the packets of the stream and the quantity of these packets are predefined according to the considered class of service CoS, according to the transmission conditions on the transmission that led to the QoS plan currently applied and according to a nominal load required for the considered class of service CoS on the transmission link.

The AMC center 130 preferentially supplies, in the activation instruction received by the first CDA application 131a at the step S1201, transmission rate information to be complied with in the context of the transmission of each stream. Either the number of packets in the sequence is predefined and known to the first CDA application 131a, or this number of packets is also supplied by the AMC center in the activation instruction. In a variant, information on the packet size in the stream and the quantity of these packets are supplied by the AMC center 130 in the activation instruction received by the first CDA application 131a at the step S1201.

The aim sought is then to increase the load on the transmission link for the considered class of service CoS in order to evaluate a loss rate for the stream, so as then to enable the AMC center 130 to determine whether the transmission conditions on the transmission link for the considered class of service CoS have improved.

The packets in each of the streams are next filled with padding data in order to achieve the required sizes. The packets of each of the streams are preferentially in accordance with the UDP protocol. The payload of these packets includes information representing the class of service CoS in order to enable the second CDA application 131b to determine with which class of service CoS the packets are associated, as are the control messages already described in relation to FIG. 4. The payload of these packets also includes sequence number information enabling the second CDA application 131b, when the CDA application 131b receives such a packet, to determine what is the position of the packet in the stream.

In a preferential embodiment, the first packet of the stream is repeated a number $N_0>1$ of times, in order to ensure that the second CDA application 131b receives at least one copy of the first packet. A plurality of successive test packets then comprise the same sequence number.

In a preferential embodiment, the last packet of the stream is repeated a number $N_1>1$ of times, in order to ensure that the second CDA application 131b receives at least one copy of the last packet. In this case also, a plurality of successive test packets then comprise the same sequence number.

To enable the second CDA application 131b to distinguish the first packet of the test stream, the first CDA application 131a may rely on a packet type field specified in the payload of each packet in the stream. A value representing a test sequence start packet, a value representing a test sequence end packet and a value representing a test sequence intermediate packet can thus be defined. In a variant, the first CDA application 131a may use a particular sequence number for beginning the test sequence, e.g. null sequence number. By knowing in advance the quantity of packets in the test sequence, the second CDA application 131b is then capable of determining what the sequence number of the last packet in the stream shall be.

If the second CDA application 131b receives a plurality of test packets with the same sequence, the CDA application 131b relies on the first copy received to make loss rate computations.

Once each of the test packet streams has been transmitted, the first CDA application 131a reactivates, in a step S1204, the congestion control mechanism described previously in relation to FIGS. 5 and 7, and, in a step S1205, deactivates the mechanism for checking improvement in the transmission conditions for the transmission link to be monitored.

Figure 13:
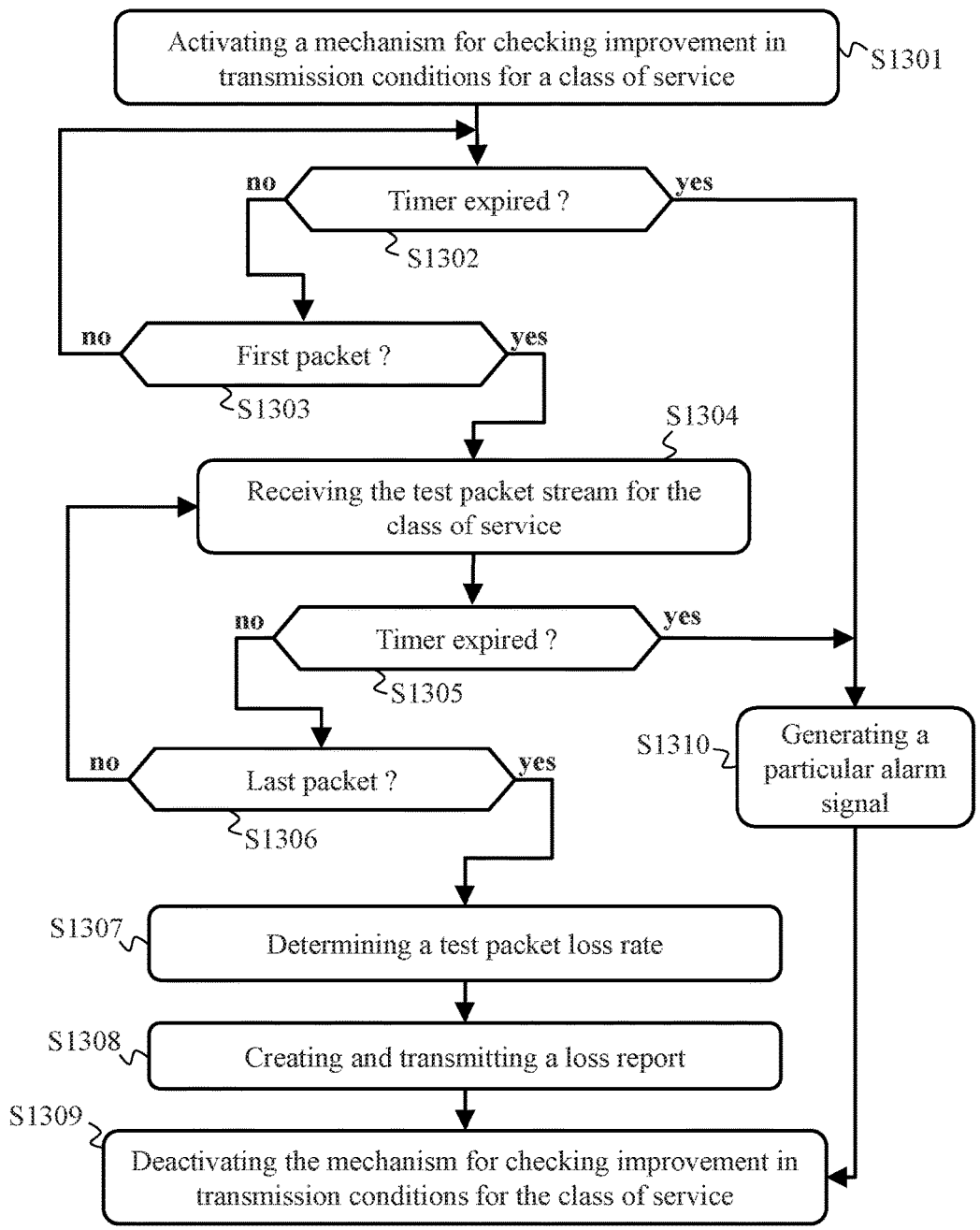
FIG. 13 schematically illustrates a second algorithm for detecting improvement in transmission conditions by class of service on the transmission link, from information relating to the test data stream.

FIG. 13 schematically illustrates a second algorithm for detecting improvement in transmission conditions by class of service CoS on a transmission link to be monitored, from information relating to the test data stream. The algorithm in FIG. 13 is implemented in conjunction with the algorithm in FIG. 12. The algorithm in FIG. 13 is implemented for each class of service CoS to which the algorithm in FIG. 12 relates. Consider that the algorithm in FIG. 13 is implemented by the second CDA application 131b that is paired with the first CDA application 131a in order to monitor the transmission link from the first item of network equipment 110a to the second item of network equipment 110b.

In a step S1301, the second CDA application 131b receives an instruction to activate the mechanism for checking improvement in the transmission conditions on the transmission link to be monitored, for a class of service CoS identified explicitly or implicitly by the activation instruction. The second CDA application 131b then activates the mechanism for checking improvement in the transmission conditions for the identified class of service CoS. The activation instruction is transmitted to the second CDA application 131b by the AMC center 130.

The AMC center 130 preferentially supplies, in the activation instruction received by the second CDA application 131b at the step S1301, transmission rate information that the first CDA application 131a will comply with in the context of the transmission of the corresponding test packet stream. Either the number of packets in the sequence is predefined and known to the second CDA application 131b, or this number of packets is also supplied by the AMC center in the activation instruction. In a variant, information on the size of the packets in the stream and the quantity of these packets is supplied by the AMC center 130 in the activation instruction received by the second CDA application 131b at the step S1301.

The second CDA application 131b then initializes, for the considered class of service CoS, a timer of predefined duration appreciably longer than the time for transferring a packet of the stream from the first CDA application 131a to the second CDA application 131b. The objective of this timer is to detect congestion situations in which no copy of the first packet of the stream is received.

In a following step S1302, the second CDA application 131b checks whether the timer has elapsed. If such is the case, a step S1310 is performed; otherwise a step S1303 is performed.

In the step S1303, the second CDA application 131b determines whether a copy of the first packet of the stream is received. As already indicated, this first packet may be identified thanks to a type field or by virtue of a predefined sequence number. When a copy of the first packet in the stream is received, a step S1304 is performed; otherwise the step S1310 is reiterated.

The second CDA application 131b reinitializes the timer with a predefined duration appreciably longer than the time for transferring the test packet stream from the first CDA application 131a to the second CDA application 131b.

In the step S1304, the second CDA application 131b awaits receiving new packets in the stream. The second CDA application 131b is then in a position to determine which packets in the sequence have been received and which packets in the sequence have been lost on the way. This enables the second CDA application 131b to estimate, for the stream, a loss rate on the transmission link to be monitored.

In a following step S1305, the second CDA application 131b checks whether the timer has elapsed. If such is the case, the step S1310 is performed; otherwise a step S1306 is performed.

In the step S1306, the second CDA application 131b determines whether a copy of the last packet of the stream is received. As already indicated this last packet may be identified thanks to a type field or by virtue of a predetermined sequence number. When a copy of the last packet of the stream is received, a step S1307 is performed; otherwise the step S1304 is reiterated.

The second CDA application 131b is then in a position, in the step S1307, to determine the packet loss rate in the stream.

In a following step S1308, the second CDA application 131b creates and transmits to the AMC center 130 a loss report representing, for the considered class of service CoS, the loss rate.

In a following step S1309, the second CDA application 131b receives an instruction to deactivate the mechanism for checking improvement in the transmission conditions on the transmission link to be monitored. The second CDA application 131b then deactivates the mechanism for checking improvement in the transmission conditions. The deactivation instruction is transmitted to the second CDA application 131b by the AMC center 130. In a variant, the second CDA application 131b decides to deactivate the mechanism for checking improvement in the transmission conditions after having transmitted the loss report to the AMC center 130.

Thus, according to the loss report transmitted by the second CDA application 131b, the AMC center 130 is capable of determining whether the transmission conditions on the transmission link have improved and of deciding, if the conditions have improved, to enforce a new less restrictive QoS plan.

In an embodiment, any message (alarms, test reports, etc) exchanged between the AMC center 130 and any CDA application in the same communication domain as the AMC center 130 are colored with the class of service CoS having the highest priority. Taking the aforementioned DSCP example, the service class code CS7 is used.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for managing congestion on a transmission link from a first item of network equipment to a second item of network equipment in a packet communication network, wherein the first item of network equipment is associated with a first congestion detection application and the second item of network equipment is associated with a second congestion detection application, and wherein the second congestion detection application implements, conjointly with the first congestion detection application, a congestion control mechanism per class of service on a transmission link in which the second congestion detection application performs, for at least one class of service, the method comprising:

receiving, for each class of service, a first control message coming from the first congestion detection application, the first control message including information representing a first volume of data colored by the class of service and transmitted by the first item of network equipment up to a first instant;

receiving, for each class of service, a second control message coming from the first congestion detection application, the second control message including information representing a second volume of data colored by the class of service and transmitted by the first item of network equipment up to a second instant;

determining a first divergence between the first volume of data and the second volume of data;

on reception of each first control message, obtaining information representing a third volume of data colored by the class of service and received by the second item of network equipment via the transmission link up to a third instant;

on reception of each second control message, obtaining information representing a fourth volume of data colored by the class of service and received by the second item of network equipment via the transmission link up to a fourth instant;

determining, for each class of service, a second divergence between the third volume of data and the fourth volume of data; and generating or not, for each class of service, an alarm signal representing congestion on the transmission link of the data colored by the class of service, according to a difference between the first divergence and the second divergence for the class of service.

2. The method for managing congestion according to claim 1, wherein the first congestion detection application:

transmits each first control message to the second congestion detection application, each first control message being colored with the class of service for which the first control message is intended; and transmits each second control message to the second congestion detection application, each second control message being colored with the class of service for which the second control message is intended.

3. The method for managing congestion according to claim 2, wherein:

the first congestion detection application obtains information representing the first volume of data and information representing the second volume of data from the first item of network equipment by sending messages colored with the class of service having a highest priority; and the second congestion detection application obtains information representing the third volume of data and information representing the fourth volume of data from the second item of network equipment by sending messages colored with the class of service having a highest priority.

4. The method for managing congestion according to claim 1, wherein each first message and each second message comprises a network level header for coloring the message with a class of service, and wherein each first message and each second message includes an application level message payload including information representing the class of service.

5. The method for managing congestion according to claim 1, wherein the first congestion detection application transmits control messages in a sequence, and the second congestion detection application:

makes a comparison, for each class of service, between the difference between the first divergence and the second divergence with a predefined threshold for a plurality of pairs of received control messages; and generates an alarm signal for congestion on the transmission link for a class of service, when the difference between the first divergence and the second divergence is greater, for the class of service, than the predefined threshold for a number N≥1 of successive pairs.

6. The method for managing congestion according to claim 1, wherein the second congestion detection application implements, conjointly with the first congestion detection application, a global congestion control mechanism on the transmission link, in which the second congestion detection application:
receives a first general control message coming from the first congestion detection application, the first general control message including information representing a fifth volume of data transmitted by the first item of network equipment up to a fifth instant, independently of a coloring of transmitted data;
receives a second general control message coming from the first congestion detection application, the second general control message including information representing a sixth volume of data transmitted by the first item of network equipment up to a sixth instant, independently of a coloring of transmitted data;
determines a third divergence between the fifth volume of data and the sixth volume of data;
on reception of each first general control message, obtains information representing a seventh volume of data received by the second item of network equipment via the transmission link up to a seventh instant, independently of a coloring of the received data;
on reception of each the second general control message, obtains information representing an eighth volume of data received by the second item of network equipment via the transmission link up to an eighth instant, independently of a coloring of the received data;
determines a fourth divergence between the seventh volume of data and the eighth volume of data; and
generates an alarm signal representing global congestion on the transmission link, according to a difference between the third divergence and the fourth divergence.

7. The method for managing congestion according to claim 6, wherein the first congestion detection application and second congestion detection application receive an instruction to activate the global congestion control mechanism on the transmission link, and in that the second congestion detection application generates an alarm signal representing a breakdown in the transmission link when a timer of predefined duration elapses without receiving a general control message.

8. The method for managing congestion according to claim 1, wherein the second congestion detection application implements, conjointly with the first congestion detection application, a mechanism for checking improvement in transmission conditions on the transmission link during which the congestion control mechanism per class of service is stopped and in which the second congestion detection application, for at least one class of service:
receives, coming from the first congestion detection application, for each class of service, a stream of test packets colored with the class of service;
determines for each received stream, a packet loss level on the transmission link; and
generates a loss report, for each class of service, including information representing a loss rate.

9. The method for managing congestion according to claim 8, wherein, in a context of the mechanism for checking improvement in the transmission conditions on the transmission link, the first congestion detection application generates the test packet stream in the form of a sequence of test packets for each class of service, each first and/or each last packet in the sequence being duplicated a predefined number of times.

10. The method for managing congestion according to claim 8, wherein an alarm management center enforces a more restrictive quality of service plan in the packet communication network according to alarm signals generated by the second congestion detection application, wherein the alarm management center instructs the first and second congestion detection applications to implement the mechanism for checking improvement in the transmission conditions on the transmission link after application of the more restrictive quality of service plan, and wherein the alarm management center enforces a less restrictive quality of service plan in the packet communication network according to loss reports generated by the second congestion detection application in the context of the mechanism for checking improvement in the transmission conditions on the transmission link.

11. The method for managing congestion according to claim 10, wherein each message exchanged between the alarm management center and the first and second congestion detection applications are colored with the class of service having the highest priority.

12. A method for managing congestion on a transmission link from a first item of network equipment to a second item of network equipment in a packet communication network, wherein the first item of network equipment is associated with a first congestion detection application and the second item of network equipment is associated with a second congestion detection application, and wherein the first congestion detection application implements, conjointly with the second congestion detection application, a congestion control mechanism per class of service on the transmission link in which the first congestion detection application performs, for at least one class of service, the method comprising:
transmitting, for each class of service, a first control message to the second congestion detection application, each first control message being colored with the class of service for which the first message is intended and including information representing a first volume of data colored by the class of service and transmitted by the first network equipment up to a first instant; and
transmitting, for each class of service, a second control message to the second congestion detection application, each second control message being colored with the class of service for which the second message is intended and including information representing a second volume of data colored by the class of service and transmitted by the first item of network equipment up to a second instant.

13. A device for management of congestion on a transmission link from a first item of network equipment to a second item of network equipment in a packet communication network,
wherein, the first item of network equipment is associated with a first congestion detection application; and
the second item of network equipment, is associated with a second congestion detection application, wherein, the device comprising:
the device configured to implement the second congestion detection application and, for at least one class of service, the device configured to:

receive, for each class of service, a first control message coming from the first congestion detection application, the first control message including information representing a first volume of data colored by the class of service and transmitted by the first item of network equipment up to a first instant;

receive, for each class of service, a second control message coming from the first congestion detection application, the second control message including information representing a second volume of data colored by the class of service and transmitted by the first item of network equipment up to a second instant;

determine a first divergence between the first volume of data and the second volume of data;

upon reception of each first control message, obtain information representing a third volume of data colored by the class of service and received by the second item of network equipment via the transmission link up to a third instant;

upon reception of each second control message, obtain information representing a fourth volume of data colored by the class of service and received by the second item of network equipment via the transmission link up to a fourth instant;

determine, for each class of service, a second divergence between the third volume of data and the fourth volume of data; and generate, or not, for each class of service, an alarm signal representing congestion on the transmission link of the data colored by the class of service, according to a difference between the first divergence and the second divergence for the class of service.

14. A device for management of congestion on a transmission link from a first item of network equipment to a second item of network equipment in a packet communication network, wherein, the first item of network equipment is associated with a first congestion detection application and the second item of network equipment is associated with a second congestion detection application, wherein the device comprises:

the device configured to implement the first congestion detection application and, for at least one class of service, the device is configured to:

transmit, for each class of service a first control message intended for the second congestion detection application, each first control message being colored with the class of service for which the first message is intended and including information representing a first volume of data colored by a class of transmission and transmitted by the first item of network equipment up to a first instant; and transmit, for each class of service, a second control message for the second congestion detection application, each second control message being colored with the class of service for which the second message is intended and including information representing a second volume of data colored by the class of service and transmitted by the first item of network equipment up to a second instant.

15. A communication system comprising:

at least one first device for management of congestion on a transmission link from a first item of network equipment to a second item of network equipment in a packet communication network, wherein, the first item of network equipment is associated with a first congestion detection application and the second item of network equipment is associated with a second congestion detection application, the device configured to implement the first congestion detection application and, for at least one class of service, is configured to:

transmit, for each class of service a first control message intended for the second congestion detection application, each first control message being colored with the class of service for which the first message is intended and including information representing a first volume of data colored by a class of transmission and transmitted by the first item of network equipment up to a first instant; and transmit, for each class of service, a second control message for the second congestion detection application, each second control message being colored with the class of service for which the second message is intended and including information representing a second volume of data colored by the class of service and transmitted by the first item of network equipment up to a second instant; and at least one second device comprising:

a device for management of congestion on a transmission link from a first item of network equipment to a second item of network equipment in a packet communication network, wherein, the first item of network equipment being associated with a first congestion detection application and the second item of network equipment being associated with a second congestion detection application, the device implements the second congestion detection application and, for at least one class of service, is configured to:

receive, for each class of service, a first control message coming from the first congestion detection application, the first control message including information representing a first volume of data colored by the class of service and transmitted by the first item of network equipment up to a first instant;

receive, for each class of service, a second control message coming from the first congestion detection application, the second control message including information representing a second volume of data colored by the class of service and transmitted by the first item of network equipment up to a second instant;

determine a first divergence between the first volume of data and the second volume of data;

on reception of each first control message, obtain information representing a third volume of data colored by the class of service and received by the second item of network equipment via the transmission link up to a third instant;

on reception of each second control message, obtain information representing a fourth volume of data colored by the class of service and received by the second item of network equipment via the transmission link up to a fourth instant;

determine, for each class of service, a second divergence between the third volume of data and the fourth volume of data; and generate or not, for each class of service, an alarm signal representing congestion on the transmission link of the data colored by the class of service, according to a difference between the first divergence and the second divergence for the class of service;

wherein the first congestion detection application implemented by each first device is paired with the second congestion detection application implemented by each second device to detect congestion on the transmission link from the first item of network equipment associated with the first congestion detection application to the second item of network equipment associated with the second congestion detection application.

* * * * *